United States Patent
Ishimoto

(10) Patent No.: US 7,755,986 B2
(45) Date of Patent: Jul. 13, 2010

(54) OPTICAL DISK APPARATUS AND SERVO CONTROL METHOD

(75) Inventor: Tsutomu Ishimoto, Tokyo (JP)

(73) Assignee: Sony Corporation, Tokyo (JP)

(*) Notice: Subject to any disclaimer, the term of this patent is extended or adjusted under 35 U.S.C. 154(b) by 429 days.

(21) Appl. No.: 11/780,727

(22) Filed: Jul. 20, 2007

(65) Prior Publication Data

US 2008/0037380 A1 Feb. 14, 2008

(30) Foreign Application Priority Data

Aug. 9, 2006 (JP) ............................. 2006-217495

(51) Int. Cl.
*G11B 7/00* (2006.01)
(52) U.S. Cl. ............. 369/44.23; 369/53.28; 369/112.24
(58) Field of Classification Search ........................ None
See application file for complete search history.

(56) References Cited

U.S. PATENT DOCUMENTS 6,292,453 B1 * 9/2001 Ichimura et al. ........ 369/112.24
2003/0174301 A1 * 9/2003 Imanishi ...................... 355/55
2006/0280063 A1 * 12/2006 Ishimoto .................. 369/44.34

FOREIGN PATENT DOCUMENTS

JP 2001-76358 3/2001

* cited by examiner

*Primary Examiner*—Lixi Chow
(74) *Attorney, Agent, or Firm*—Oblon, Spivak, McClelland, Maier & Neustadt, L.L.P.

(57) ABSTRACT

An optical disk apparatus includes: a light source that emits laser light; an optical section including an objective lens group positioned in close proximity to an optical recording medium to generate near-field light from laser light emitted from the light source; a gap servo section configured to control a gap between the optical recording medium and the optical section on the basis of a return light quantity of the laser light via the optical section; a focus adjusting section configured to adjust focus of the near-field light radiated onto the optical recording medium of the optical section, in a state where gap servo is being performed by the gap servo section; and a gap servo correcting section configured to correct the gap servo by the gap servo section when focus of the near-field light is adjusted by the focus adjusting section.

4 Claims, 25 Drawing Sheets

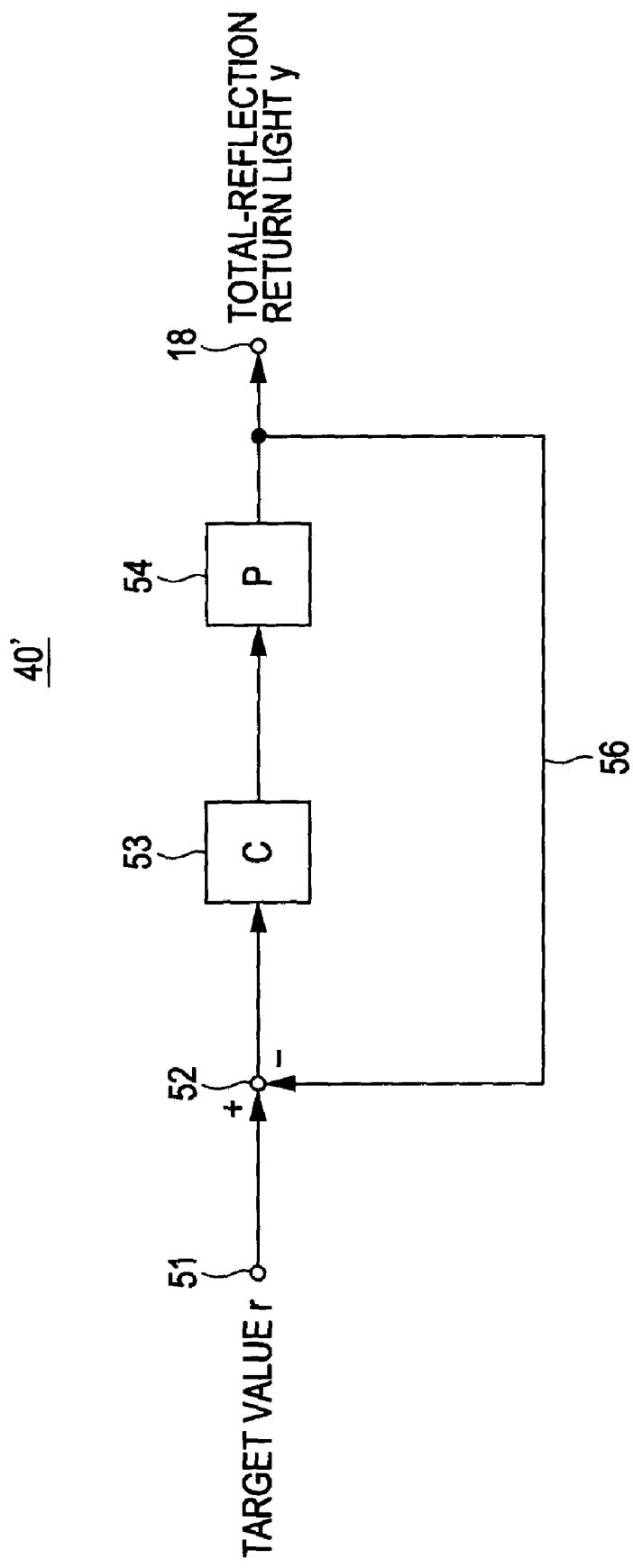

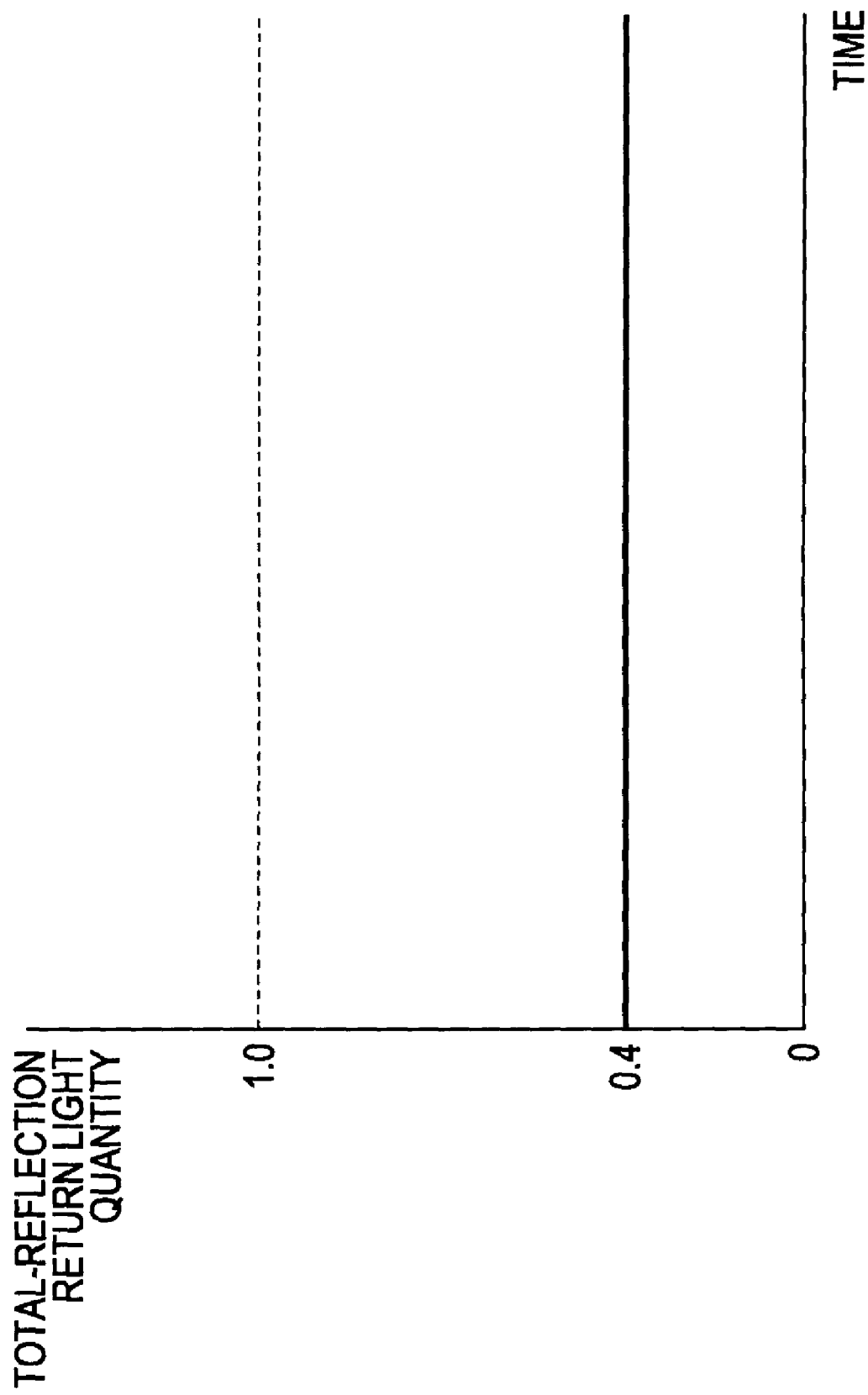

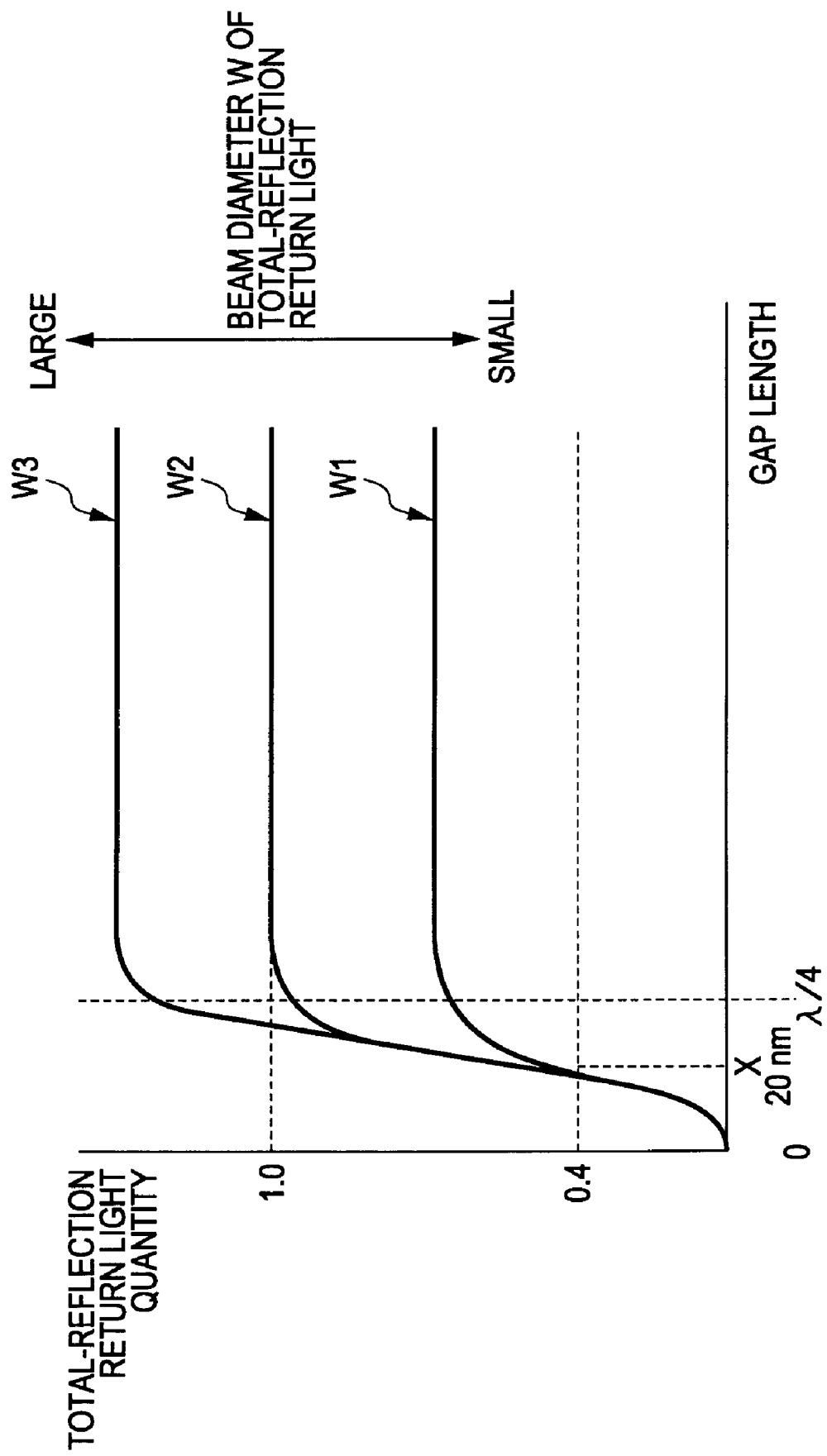

| STEP NUMBER | ADDRESS |
|---|---|
| 0 | 000 |
| 1 | 001 |
| . | . |
| . | . |
| . | . |
| 100 | 064 |
| . | . |
| . | . |
| 1000 | 3E8 |
| . | . |

| ADDRESS | GAIN |
|---------|-------|
| 0 | 0.000 |
| 1 | 0.001 |
| . | . |
| . | . |
| . | . |
| 064 | 0.900 |
| . | . |
| . | . |
| 3E8 | 1.200 |
| . | . |

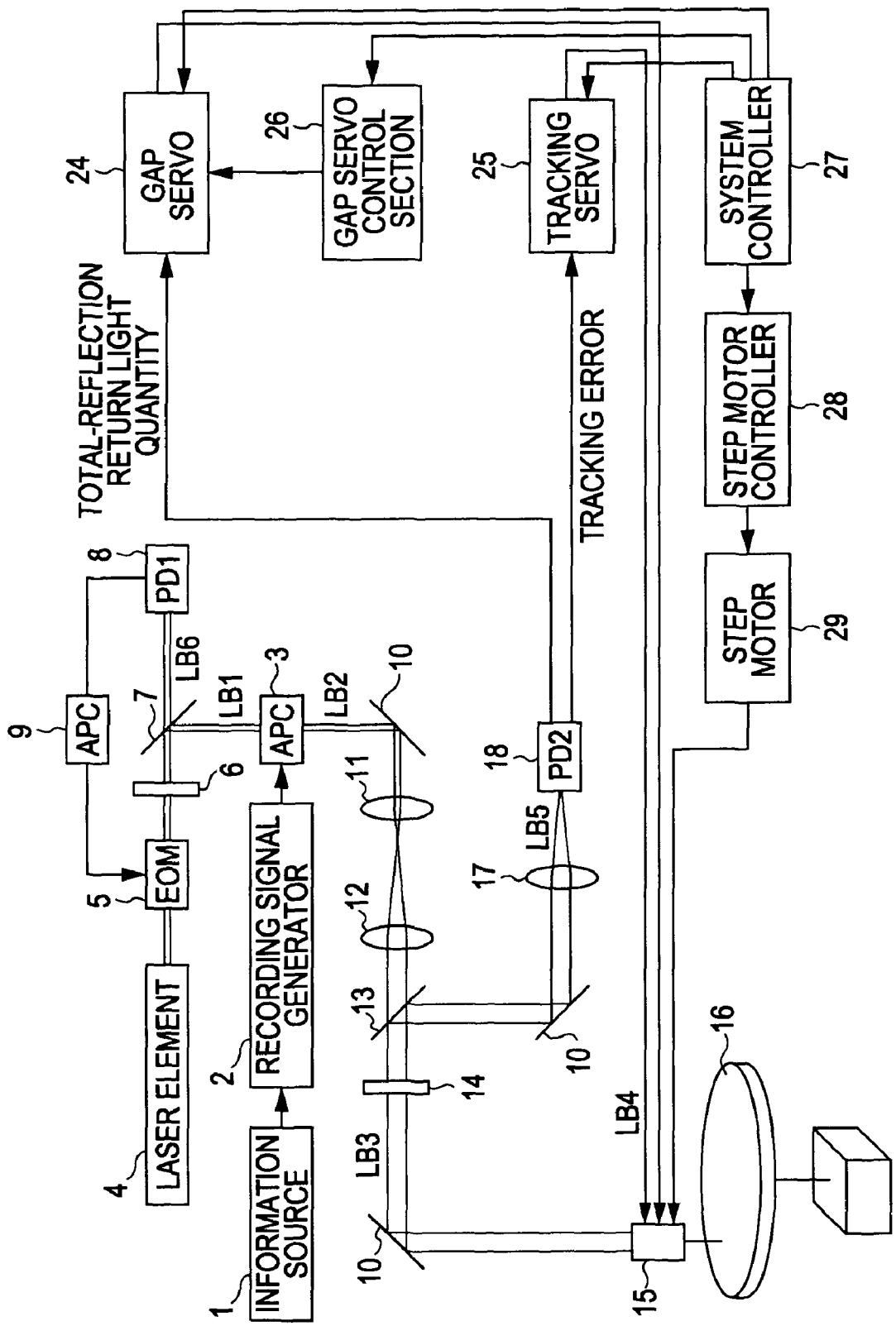

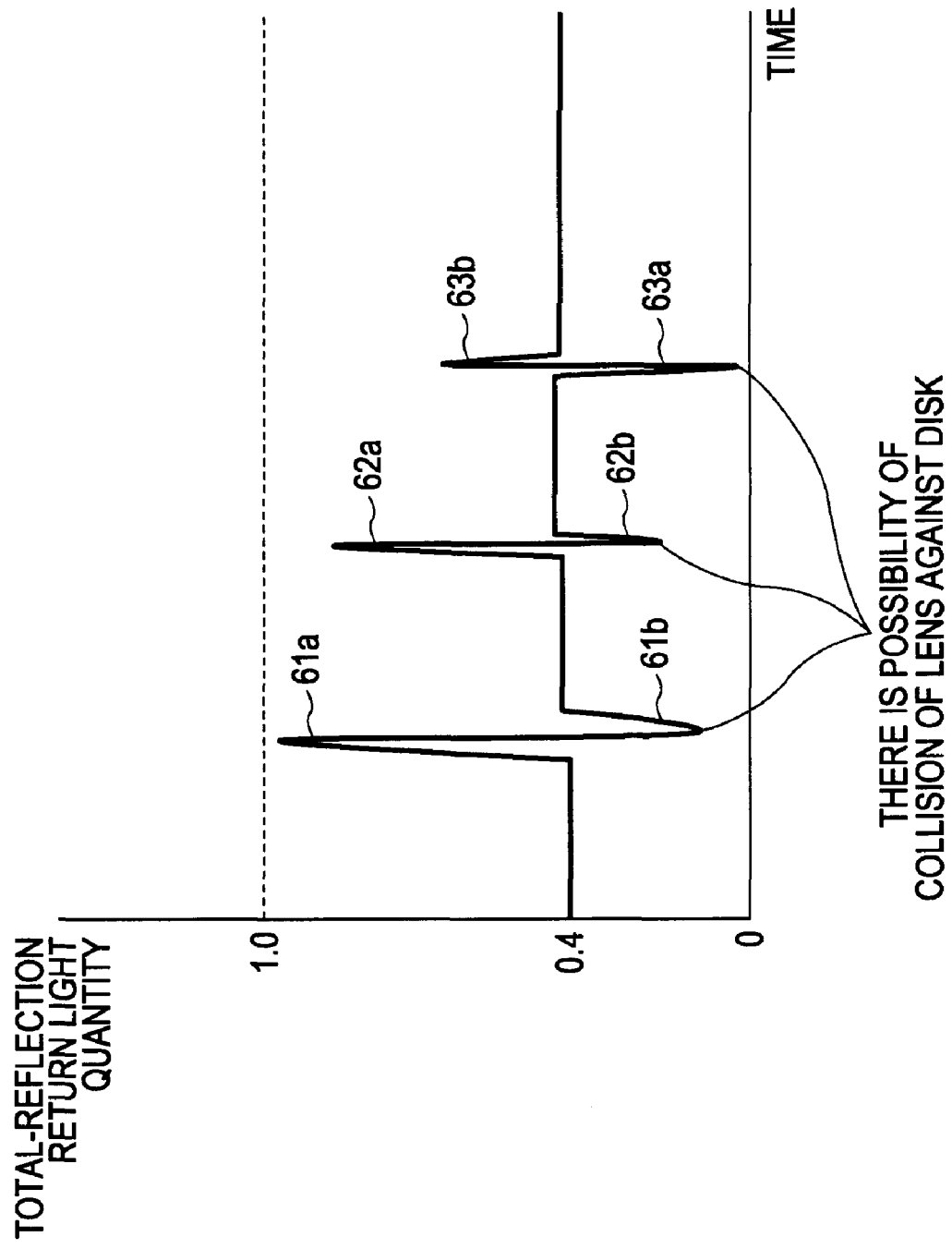

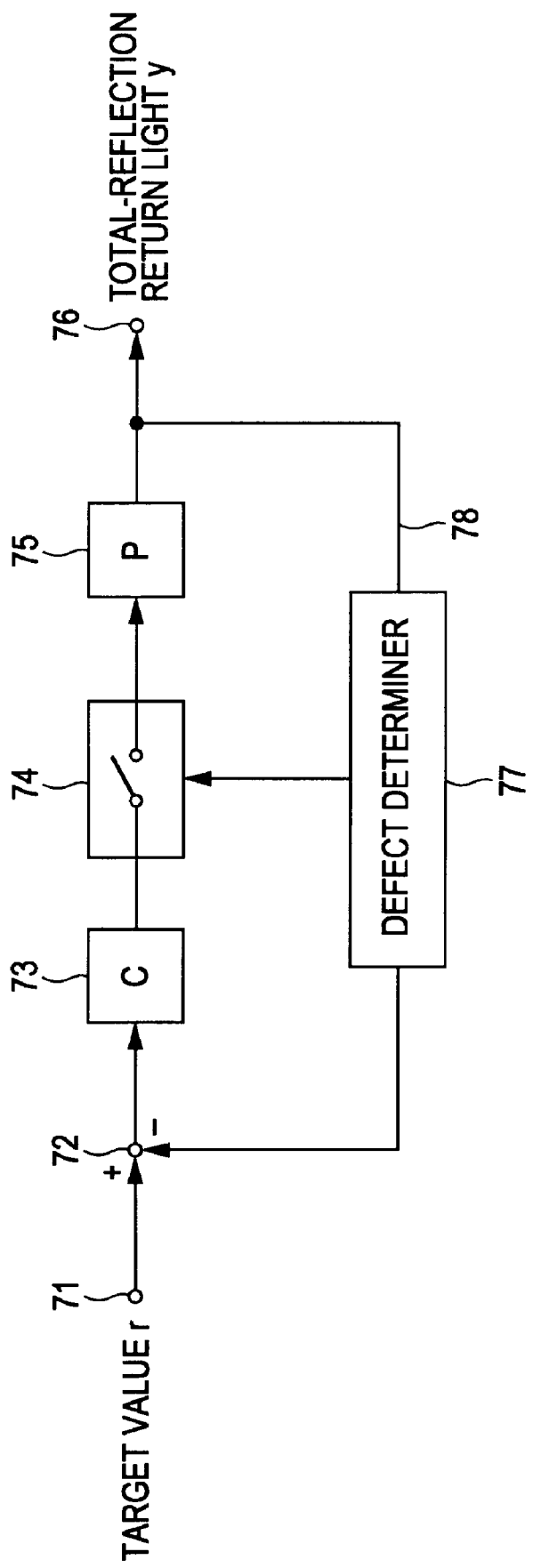

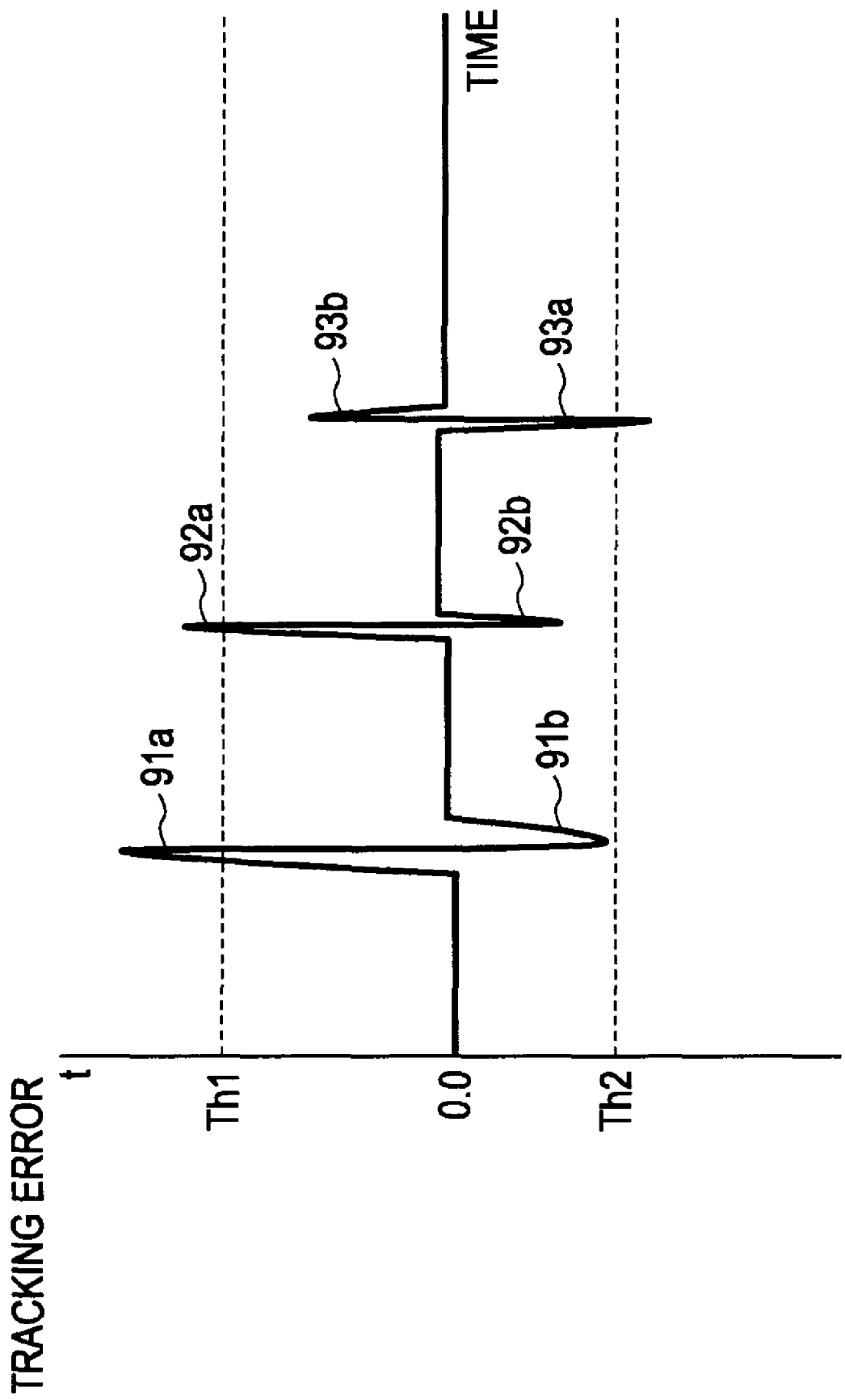

OPTICAL DISK APPARATUS AND SERVO CONTROL METHOD

CROSS REFERENCES TO RELATED APPLICATIONS

The present invention contains subject matter related to Japanese Patent Application JP 2006-217495 filed in the Japanese Patent Office on Aug. 9, 2006, the entire contents of which are incorporated herein by reference.

BACKGROUND OF THE INVENTION

1. Field of the Invention

The present invention relates to an optical disk apparatus that records and/or reproduces information to/from an optical recording medium by using near-field light. The present invention also relates to a servo control method used for the optical disk apparatus.

2. Description of the Related Art

In the related art, near-field light obtained by a solid immersion lens such as an SIL (Solid Immersion Lens) formed by a two-group lens or an SIM (Solid Immersion Mirror) formed as a single lens is often utilized as recording and/or reproduction means. The use of such near-field light makes it possible to achieve a finer spot diameter to meet the need for higher density optical disks. The SIL, which is interposed between a condenser lens and an optical disk as an optical recording medium, is a lens of a high refractive index shaped like a spherical lens that is partially cut away. The SIL is arranged such that its spherical surface faces the condenser lens side and its surface opposite to the spherical surface faces the signal recording surface of the optical disk. By interposing such an SIL between the condenser lens and the optical disk, a numerical aperture larger than the numerical aperture of the condenser lens can be realized, which makes it possible to achieve a finer spot diameter as described above.

To perform recording/reproduction to/from an optical disk by using an SIL, it is necessary to condense recording laser onto an end face of the SIL, bring the end face of the SIL (surface of the SIL opposed to the optical disk) and the optical disk close to each other to a distance at which near-field light is generated (¼ of the wavelength of light or less, typically about 100 nm or less), and keep that distance constant to thereby keep the size of the condensed light spot on the optical disk constant.

Japanese Unexamined Patent Application Publication No. 2001-076358 discloses a technique for keeping the distance between an SIL end face and an optical disk at a predetermined distance. As the gap control for controlling the distance between the SIL end face and the optical disk to be constant, the technique includes first optical means for condensing light to be radiated onto an optical recording medium, and second optical means interposed between the first optical means and the optical disk to realize a numerical aperture larger than the numerical aperture of the first optical means, and the distance between the second optical means and the optical disk is kept at a predetermined distance by using the linear characteristic of the quantity of total-reflection return light from the optical disk within the near-field region between an end face of the second optical means and the optical disk (specifically, the quantity of return light from an irradiation surface opposed to the optical disk).

One type of such a near-field optical disk apparatus is an apparatus that uses only one wavelength. That is, the near-field optical disk apparatus of this type is one in which a gap-servo laser light source and a read/write laser light source are the same single laser light source.

SUMMARY OF THE INVENTION

In the near-field optical disk apparatus using only one wavelength described above, if focus adjustment is performed after the gap between the SIL end face and the disk is adjusted by gap servo so as to generate near-field light, the gap error is changed. The term focus adjustment as used herein refers to such adjustment as to whether the focus point of near-field light generated by gap servo, that is, the focus position of the near-field light is to be set on the disk surface or inside the disk.

The focus adjustment is effected by adjusting the lens-to-lens distance in an expander lens including a concave lens and a convex lens, for example. When the above-mentioned distance in this expander lens is changed for focus adjustment, the gap error previously adjusted to λ/4 by gap servo is also changed at the same time.

During a period before gap servo, since the level of total-reflection return light quantity at far field changes, normalization is accomplished by manual gain adjustment. Further, during gap servo, although the total-reflection return light quantity is kept constant at a predetermined level due to servo even when the expander lens is moved, the actual gap length differs. Therefore, performing focus adjustment during gap servo operation causes the gap length to change. For this reason, focus adjustment is not performed during gap servo operation in near-field optical disk apparatuses of the related art.

Therefore, in the case of a near-field optical disk apparatus that records/reproduces signals to/from an optical disk capable of multi-layer recording, when the focus position is moved to a desired recording layer, the gap previously adjusted to λ/4 by gap servo is displaced.

In the case of a single-layer optical disk, if the gap is controlled to be constant, no focus servo is necessary provided that the focus position is fixed in advance. However, fine adjustment of the focus position is often required in order to optimize the jitter value or error rate value of a recording/reproduction signal, so it is desirable to perform focus adjustment simultaneously with gap servo.

It is thus desirable to provide a near-field optical disk apparatus whose gap-servo laser light source and read/write laser light source are the same and which uses only one wavelength, in which the gap length is kept constant at all times even when an expander for focus adjustment is moved, thereby making it possible to suppress a variation in gap length. It is also desirable to provide a servo control method that can be executed on the optical disk apparatus.

According to an embodiment of the present invention, there is provided an optical disk apparatus which performs recording and/or reproduction of information with respect to an optical recording medium by using near-field light, including: a light source that emits laser light; optical means including an objective lens group positioned in close proximity to the optical recording medium to generate near-field light from laser light emitted from the light source; gap servo means for controlling a gap between the optical recording medium and the optical means on the basis of a return light quantity of the laser light via the optical means; focus adjusting means for adjusting focus of the near-field light radiated onto the optical recording medium of the optical means, in a state where gap servo is being performed by the gap servo means; and gap servo correcting means for correcting the gap servo by the gap servo means when focus of the near-field light is adjusted by the focus adjusting means.

The gap servo means controls the gap between the optical recording medium and the optical means on the basis of a return light quantity of the laser light via the optical means. The focus adjusting means adjusts the focus of the near-field light radiated onto the optical recording medium of the optical means, in a state where gap servo is being performed by the gap servo means. The gap servo correcting means corrects the gap servo by the gap servo means when the focus of the near-field light is adjusted by the focus adjusting means.

Therefore, even when the expander for focus adjustment is moved, the influence of a variation in gap error is eliminated, thereby making it possible to keep the gap length constant.

According to an embodiment of the present invention, there is provided a servo control method executed by an optical disk recording apparatus that performs recording/reproduction of information with respect to an optical recording medium by using near-field light, including: a gap servo step of controlling a gap between the optical recording medium and optical means on the basis of a return light quantity of laser light via the optical means, the optical means including an objective lens group positioned in close proximity to the optical recording medium to generate near-field light from the laser light emitted from a light source; a focus adjusting step of adjusting focus of the near-field light radiated onto the optical recording medium of the optical means, in a state where gap servo is being performed by the gap servo step; and a gap servo correcting step of correcting the gap servo by the gap servo step when focus of the near-field light is adjusted by the focus adjusting step.

The gap servo step controls the gap between the optical recording medium and the optical means on the basis of the return light quantity of laser light via the optical means. The focus adjusting step adjusts the focus of the near-field light radiated onto the optical recording medium of the optical means, in a state where gap servo is being performed by the gap servo step. The gap servo correcting step corrects the gap servo by the gap servo step when the focus of the near-field light is adjusted by the focus adjusting step.

As a specific example of this servo control method, values of a normalized gain corresponding to amounts of expander movement are stored into a memory in advance. Then, reading from the memory is performed in accordance with an amount of expander movement to extract a normalized gain. By multiplying a gap error by this normalized gain, the influence of a change in gain due to expander movement is eliminated, and a change in gap length due to expander movement is suppressed.

According to the present invention, in a near-field optical disk apparatus using only one wavelength, gap servo is performed by using a total-reflection return light quantity multiplied by a normalized gain corresponding to an expander position, thereby making it possible to keep the gap constant at all times irrespective of the expander position, that is, the focus position. Accordingly, even when the focus is shifted, for example, even in the case of a near-field optical disk apparatus with which multi-layer recording has been performed, stable gap servo can be performed. Further, it is possible to obtain a recording/reproduction signal of a higher quality through fine adjustment of the focus.

BRIEF DESCRIPTION OF THE DRAWINGS

FIG. 6 is a configuration diagram of a gap servo section that utilizes the linear relationship between the gap length and the total-reflection return light quantity;

FIG. 7 is a characteristic diagram of total-reflection return light quantity;

FIG. 9 is a characteristic diagram showing three characteristic curves of total-reflection return light quantity when the beam diameter of total-reflection return light is W1, W2, and W3;

FIG. 13 is a chart showing a step number/address conversion table;

FIG. 14 is a chart showing a specific example of addresses and gains stored in a memory;

FIG. 16 is a configuration diagram of a near-field optical disk recording apparatus;

FIG. 17 is a characteristic diagram of total-reflection return light quantity when there is a possibility of collision of a lens against a disk;

FIG. 20 is a detailed configuration diagram of a gap servo section used in an embodiment of the present invention;

FIG. 25 is a diagram showing the setting of thresholds.

DESCRIPTION OF THE PREFERRED EMBODIMENTS

Hereinbelow, the best mode for carrying out the present invention will be described with reference to the drawings. It is to be understood that the embodiment described below is a specific preferred example of the present invention, and although the embodiment is subject to various technically preferred limitations, the scope of the present invention is not limited to these unless it is specifically stated that the present invention is limited thereto.

Figure 1:
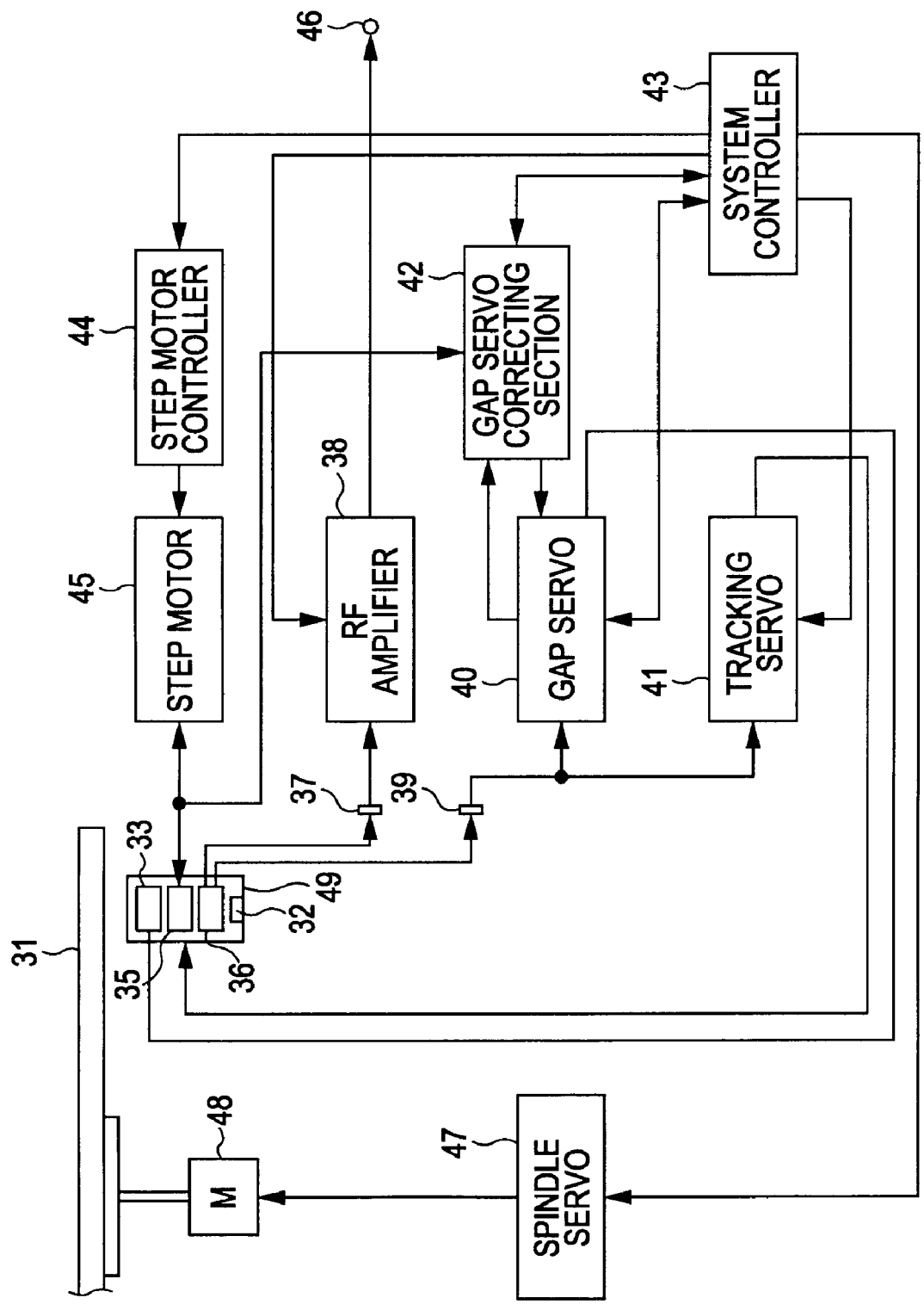
FIG. 1 is a block diagram of a near-field optical disk reproducing apparatus.

FIG. 1 is a diagram showing the configuration of an optical disk reproducing apparatus according to an embodiment of the present invention. This optical disk recording apparatus is a near-field optical disk reproducing apparatus that reproduces signals from an optical disk 31 by utilizing near-field light. In particular, this near-field optical disk reproducing apparatus is an apparatus of a type which uses only one wavelength and in which a gap-servo laser light source and a read/write laser light source are the same. Since only one laser light source is provided, it is possible to achieve a reduction in size and cost as compared with, for example, an apparatus with two light sources in which a gap-servo laser light source and a read/write laser light source are separately provided.

This near-field optical disk reproducing apparatus includes a laser light source 32 as the above-mentioned single laser light source for emitting laser light, an optical head 49 including an objective lens group 33 positioned in close proximity to the optical disk 31 to generate near-field light from the laser light emitted from the laser light source 32, and a gap servo section 40 that controls the gap between the optical disk 31 and an end face of a solid immersion lens (SIL) within the objective lens group 33 which will be described later, on the basis of the return light quantity of laser light via the object lens group 33.

Further, this near-field optical disk reproducing apparatus includes a focus adjusting section 35 that adjusts the focus of the near-field light radiated onto the optical disk 31 of the optical head 49 in a state where gap servo is being performed by the gap servo section 40, and a gap servo correcting section 42 that corrects the gap servo by the gap servo section 40 when adjusting the focus of the near-field light with respect to the optical disk 31 by the focus adjusting section 35.

Figure 2:
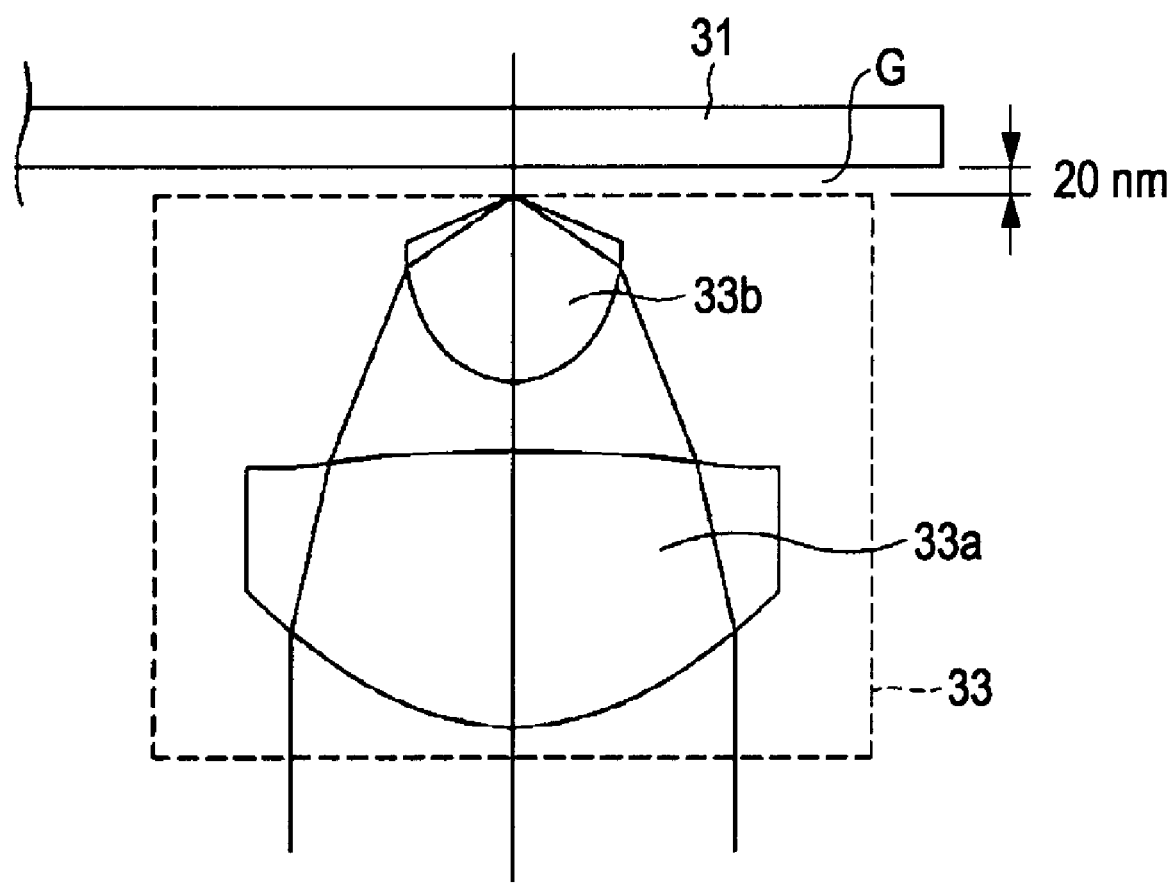
FIG. 2 is a diagram showing an objective lens group.

As shown in FIG. 2, the objective lens group (two-group lens) 33 includes an aspherical lens 33a with an $NA \leq 1$, and a solid immersion lens (SIL) 33b having a refractive index n. These two lenses are combined with each other to form a lens with an NA>1. For example, when a super-semispherical SIL is used, an NA can be represented by the following expression (1)

$$NA = n^2 * NA \quad (1)$$

Figure 3:
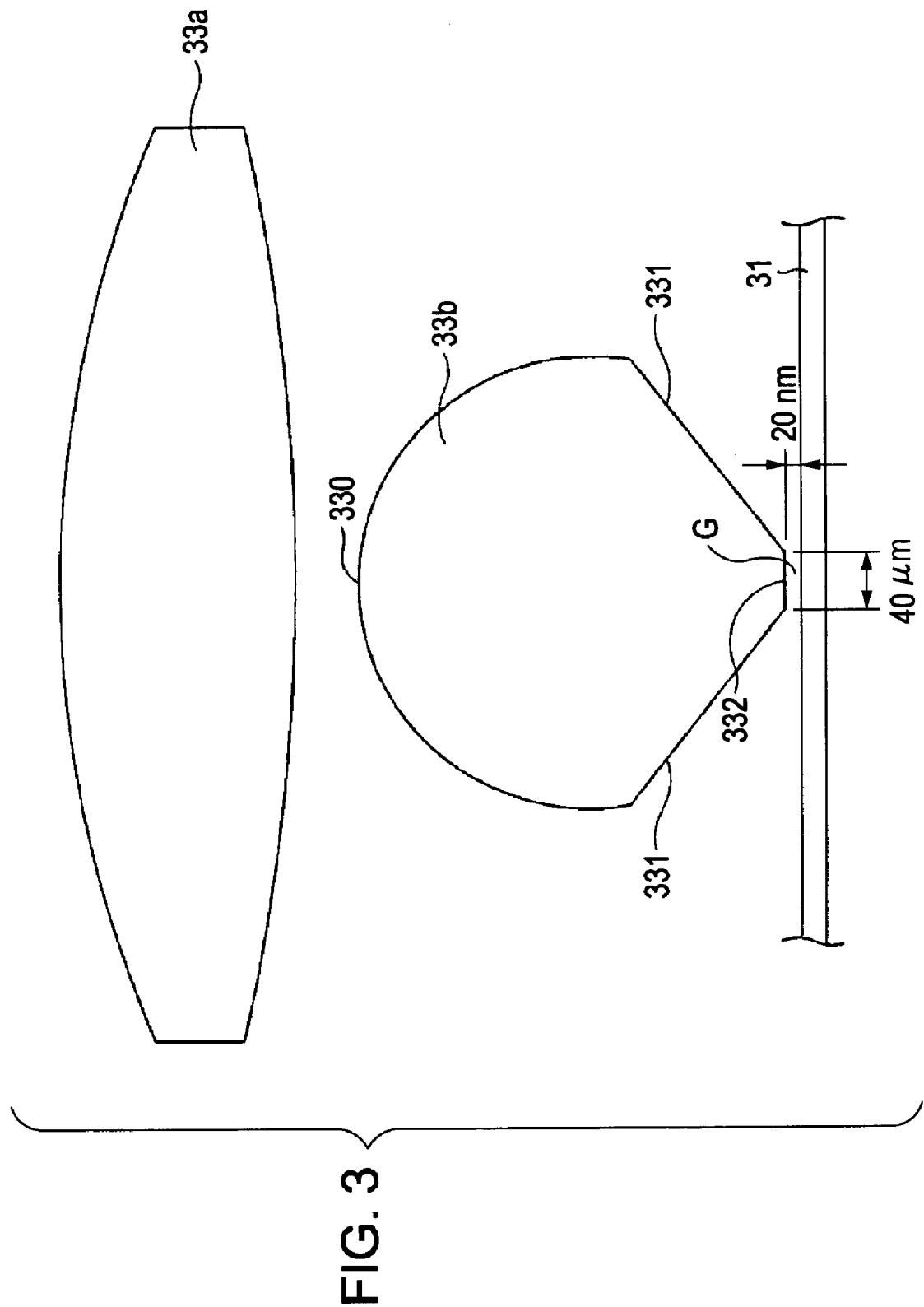
FIG. 3 is a diagram showing an SIL.

The aspherical lens 33a converges incident laser light onto the SIL 33b. The SIL 33b is formed by cutting away a part of a spherical lens into a chevron shape, with its top portion shaped flat, for example. More specifically, as shown in FIG. 3, the SIL 33b is formed in a super-semispherical shape, with a taper 331 formed such that a spherical surface 330 is formed on the aspherical lens 33a side and a chevron is formed on the disk side located opposite to the aspherical lens 33a. The taper 331 is positioned as if it were a ridge leading to the peak with respect to a flat portion (peak portion) 332 formed so as to held in parallel to the surface of the disk 31. Therefore, the flat portion 332 is circular as viewed from below, and has a diameter of about 40 μm, for example.

In the near-field optical disk apparatus, the gap between the end face of the SIL 33b and the optical disk 31 is maintained at λ/4 or less so that light with an NA>1 is transmitted to the disk side as evanescent light or reflected light from the disk is returned to the lens side. A characteristic feature of the near-field optical disk apparatus is that signals are recorded and reproduced by means of this evanescent light. Another major feature of the near-field optical disk apparatus distinct from the optical disk according to the related art is that in order to obtain evanescent light, the gap between the lens and the disk must be maintained at λ/4 or less, for example, at approximately 100 nm when the wavelength λ=405 nm, or at about 20 nm to obtain a more preferable level of evanescent light.

The optical head 49 guides the laser light emitted from the laser light source 32 to the objective lens group 33 through the focus adjusting section 35, and also includes a polarization optical section 36 that guides return light from the objective lens group 33 to two detecting sections 37 and 39 that will be described later. Although, broadly speaking, the laser light source 32 is included in the optical head 49, for the purpose of clarifying the constituent features of the present invention, the laser light source 32 is specified separately from the optical head 49 in this specification.

Figure 4:
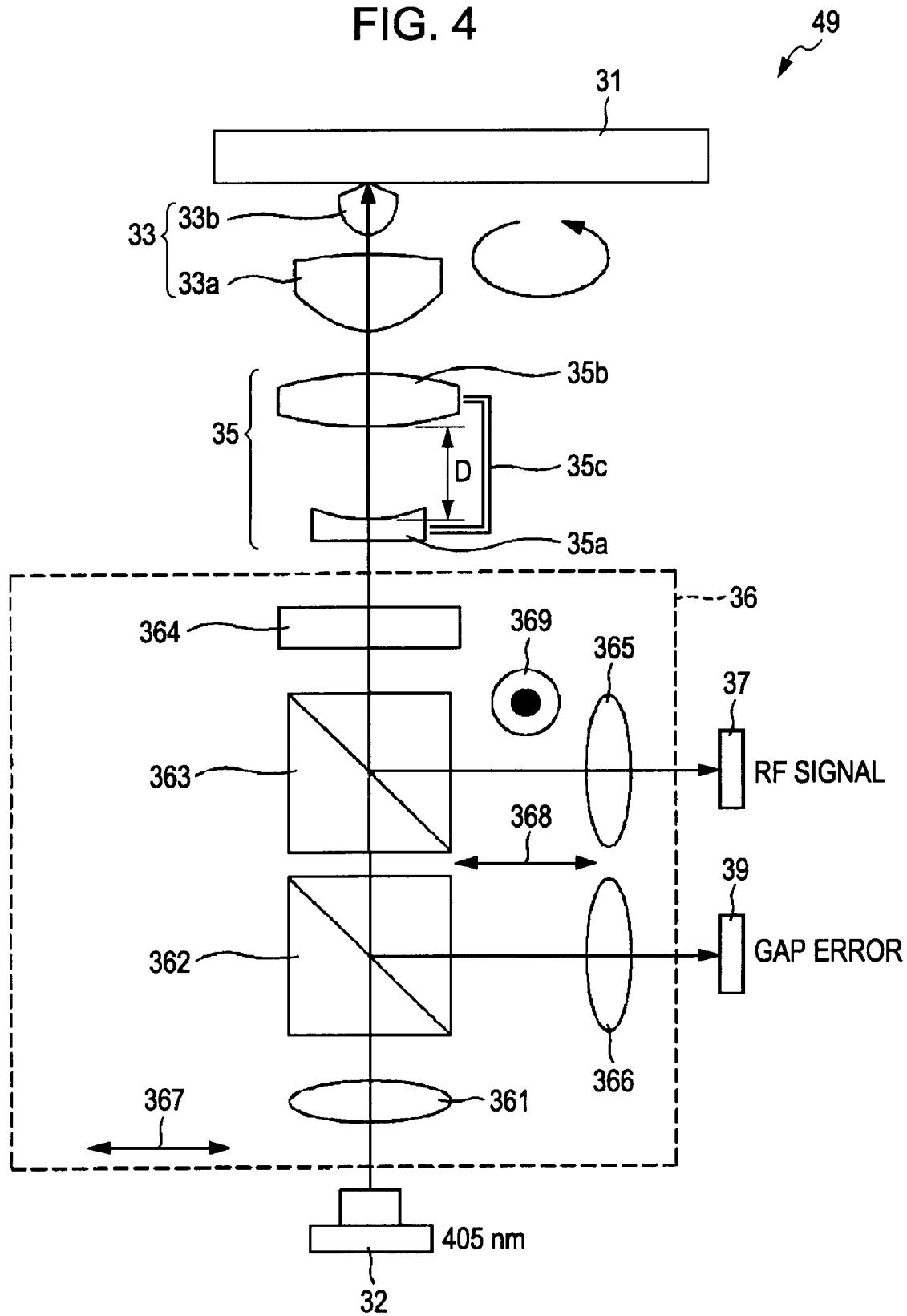
FIG. 4 is a configuration diagram of the optical system of a near-field optical disk reproducing apparatus.

FIG. 4 shows the optical head 49 of the near-field optical disk apparatus in detail. In the optical head 49, laser light emitted from the laser light 32 that is a semiconductor laser (Blue LD) such as a blue LED is direct polarized laser light having a polarization plane (arrow symbol 367) parallel to the plane of drawing, and made incident on a polarization beam splitter (PBS) 362 after being collimated into parallel light beams by a collimator lens 361 in the polarization optical section 36. The wavelength λ of the laser light emitted from the laser light source 32 is, for example, 405 nm.

The above-mentioned laser light that has transmitted through the polarization beam splitter 362 further transmits through a polarization beam splitter 363, and as it transmits through a quarter wavelength (λ/4) plate (QWP) 364 whose crystal axis is tilted by 45° with respect to the direction of incident polarized light, the laser light is changed into circularly polarized light before being guided to an expander lens group serving as the focus adjusting section 35. The expander lens group (focus adjusting section) 35 is formed by a combination of a concave lens 35a and a convex lens 35b, and adjusts the focus of the laser light that has been changed into circularly polarized light. Specifically, focus adjustment is effected by increasing or decreasing the distance D between the concave lens 35a and the convex lens 35b in accordance with the step number of a step motor that will be described later by an actuator 35c having a screw section or gear.

The laser light that has passed through the expander lens group 35 is made incident on the aspherical lens 33a that constitutes the objective lens group 33 together with the SIL 33b.

When the gap G between the end face of the SIL 33b and the optical disk 31 is kept at λ/4 or less, for example, 20 nm as described above, the above-mentioned laser light is transmitted to the disk side as evanescent light from the end face of the SIL 33b. This evanescent light becomes light with an NA>1, and is condensed onto the signal recording surface of the optical disk as it is transmitted to the disk side, thus allowing recording and reproduction of signals by means of this evanescent light. When the above-mentioned gap is larger than λ/4, total-reflection light at the SIL end face becomes 1.0 following normalization as will be described later. When the above-mentioned gap becomes λ/4 or less, evanescent light is generated, and because part of light components with an NA>1 is made incident on the disk side, the quantity of total-reflection return light decreases.

The optical head 49 is used for recording/reproducing information to/from an optical disk onto which information signals have been recorded by means of irregular pit patterns, or an optical disk onto which information signals are recorded by utilizing phase change. That is, light beams emitted from a semiconductor laser provided to this head and radiated to the signal recording surface of the optical disk 31 after being condensed by the objecting lens group 33 including the aspherical lens 33a and the SIL 33b are reflected by this signal recording surface, and then made incident on the objective lens group 33 again.

The reflected light from the signal recording surface of the optical disk undergoes reflection in a manner that varies in accordance with the presence/absence of pit patterns formed in the signal recording surface of the optical disk, and is made incident on the objective lens group 33 again. The reflected light incident on the objective lens group 33 is made incident on the PBS 363 after transmitting through the SIL 33b and the aspherical lens 33a, the expander lens group 35 including the convex lens 35b and the concave lens 35a, and further the QWP 364.

Figure 5:
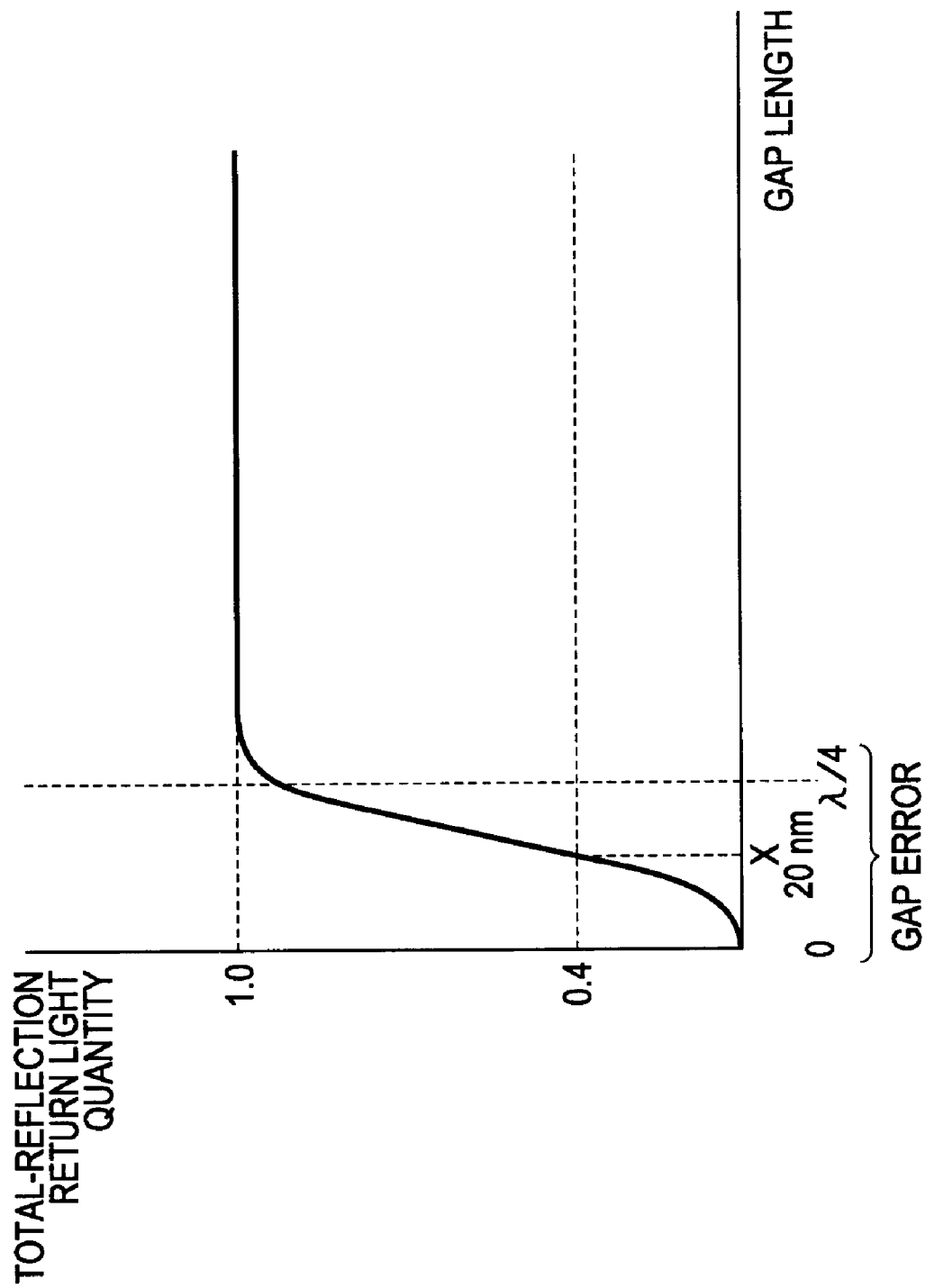
FIG. 5 is a characteristic diagram of total-reflection return light quantity.

The PBS 363 separates the return light that has transmitted through the QWP 364 into a light component having a polarization plane perpendicular (mark 369 indicating a perpendicular direction) to the incident laser light, and a light component having a polarization plane parallel (arrow symbol 368 indicating a parallel direction) to the incident laser light. The former (light component having a polarization plane perpendicular to the incident laser light) represents an RF signal obtained by reproducing information recorded on the optical disk 31, and is detected by the first detector 37. The latter, that is, a light component having a polarization plane parallel to the incident laser light, represents total-reflection return light, and is detected by the second detector 39 as a signal having the characteristic as shown in FIG. 5 that will be described later.

If the second detector 39 has two split detection regions, for example, a gap error signal used for gap servo is obtained as a sum signal of detection signals of the two split detection regions. Further, a tracking error signal used for tracking servo is obtained as a difference signal between the two split detection regions, that is, as a push-pull signal. It is needless to mention that if the second detector 39 has four split detection regions, gap and tracking error signals are generated by a corresponding appropriate method.

Returning to FIG. 1, the configuration of the near-field optical disk reproducing apparatus will be described in more detail. This near-field optical disk reproducing apparatus includes an RF amplifier 38 that performs reproduction signal processing on the RF signal detected by the first detector 37 and supplies the resultant signal to an output terminal 46, and a tracking servo section 41 that controls the tracking of the optical head 49 with respect to the recording track on the optical disk 31, in a state where gap servo is being performed by the gap servo section 40. The near-field optical disk apparatus also includes a spindle servo section 47 that controls the rotation of a spindle motor 48 of the optical disk 31 on the basis of a detection signal from the first detector 37 or second detector 39, or the like.

Further, the near-field optical disk reproducing apparatus includes a step motor 45 for driving the gear or screw of the above-described actuator 35c of the focus adjusting section 35, and a step motor controller 44 that controls the step motor 45. Furthermore, the near-field optical disk reproducing apparatus includes a system controller 43 that supplies a control signal for step motor control to the step motor controller 44, and supplies a control signal to each of the RF amplifier 38, the gap servo correcting section 42, the gap servo section 40, the tracking servo section 41, and the spindle servo section 47 to control the respective sections.

The operation principle of the near-field optical disk reproducing apparatus configured as described above will be described below. In FIG. 5, the horizontal axis represents the gap length, and the vertical axis represents the quantity of total-reflection return light at the SIL end face. A characteristic feature of the light shown in FIG. 5 is that at distances greater than a distance at which evanescent light is generated (greater than $\lambda/4$), no evanescent light is generated, and light components with NAs>1 all undergo total reflection by the SIL end face. Accordingly, the quantity of return light becomes constant. For example, it becomes 1.0 following normalization.

On the other hand, at distances equal to or less than the distance at which evanescent light is generated ($\lambda/4$ or less), evanescent light is generated, and the quantity of total-reflection return light decreases because part of light components with NAs>1 is made incident on the disk side. The quantity of total-reflection return light becomes zero at the point where the SIL end face and the disk come into complete contact with each other. Therefore, the characteristic as shown in FIG. 5 results. At the distances equal to or less than a distance at which evanescent light is generated ($\lambda/4$ or less), the relationship between the gap length and the total-reflection return light quantity becomes substantially linear. At the point where the gap length is 0 and the SIL end face and the disk come into complete contact with each other, the total-reflection return light quantity becomes 0, and all the quantity of light is radiated from the SIL end face to the disk side as evanescent light. However, bringing the SIL end face and the optical disk into contact with each other may cause damage to both these components. In view of this, according to this embodiment, the above-mentioned gap length is set to 20 nm because it can provide a desirable RF signal level while avoiding the contact between the SIL end face and the disk.

In order to perform stable recording/reproduction of information signals onto/from the signal recording layer of an optical disk by means of evanescent light, as described above, it is necessary to keep the gap between the end face of a lens such as an SIL and the disk constant at $\lambda/4$ or less, for example, 20 nm. This can be achieved by performing feedback servo with the total-reflection return light at $\lambda/4$ or less as a gap error signal. That is, since a linear relationship holds between the gap length and the total-reflection return light at $\lambda/4$ or less as described above, the gap length can be kept constant by controlling the total-reflection return light quantity constant.

FIG. 6 is a block diagram of a gap servo section 40' that utilizes the linear relationship between the gap length and the total-reflection return light quantity as described above. It should be noted, however, that unlike in the gap servo section 40 used in the near-field optical disk reproducing apparatus according to this embodiment, in the gap servo section 40', gap servo correction accompanying focus adjustment in the focus adjustment section 30 is not performed by the gap servo correcting section 42.

In FIG. 6, symbol r denotes a target value (corresponding to 0.4 shown in FIG. 5) supplied to an input terminal 51, symbol C denotes a controller (for example, a PID or phase-lead compensation) 53, symbol P denotes an actuator 54, and symbol y denotes the quantity of total-reflection return light that is outputted from an output terminal 18 and returned to a subtracter 52 via a feedback path 56. By feeding back the total-reflection return light quantity y to the target value by using the subtracter 52, it is possible to keep the gap constant. The details of this operation are as follows. The difference between the target value r and the total-reflection return light quantity y is calculated by the subtracter 52, and this is inputted to the controller 53 as a deviation. With the output of the controller 53 as a controlled variable, an actuator with the objective lens group (two-group lens) 33 as a control target built therein, for example, a piezoelectric element is driven, thereby making the total-reflection return light quantity y conform to the control target value r that is constant.

In the case where the gap between the SIL end face and the disk is kept constant, the total-reflection return light quantity becomes as shown in FIG. 7. In FIG. 7, time is taken along the horizontal axis r, and total-reflection return light quantity is taken along the vertical axis. If the above-mentioned gap can be kept at 20 nm, for example, the total-reflection return light quantity remains constant at 0.4 with the passage of time. This represents an ideal characteristic diagram and is indicative of a state in which absolutely no flaw nor dust is present on the optical disk.

However, in a near-field optical disk apparatus using only one wavelength, when focus adjustment is performed after the gap between the SIL end face and the disk is adjusted by gap servo so as to generate near-field light, the gap error is changed. In this regard, focus adjustment is effected by adjusting the lens-to-lens distance D of the expander lens 35 including a concave lens and a convex lens by the actuator 35c, for example. When the above-mentioned distance D of this expander lens is varied to perform focus adjustment, the gap error previously adjusted to $\lambda/4$ by gap servo is also changed at the same time.

Figure 8A:
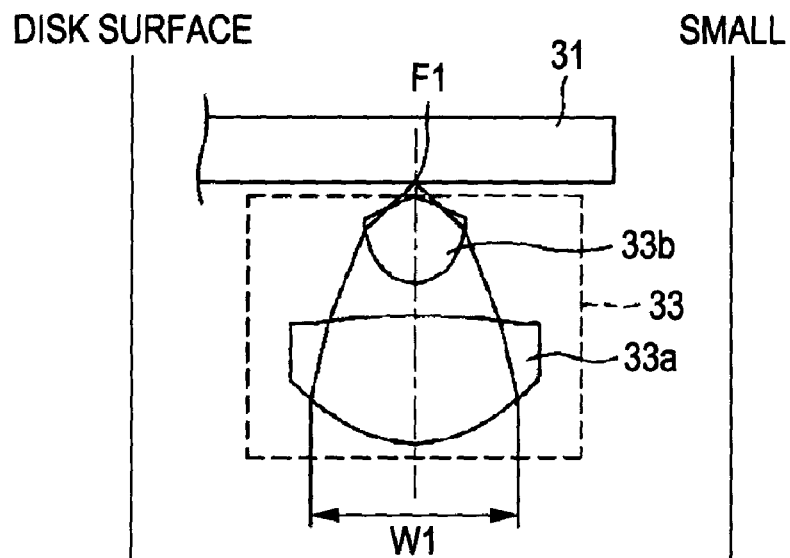
FIGS. 8A to 8C are diagrams illustrating the operation of an expander.
Figure 8B:
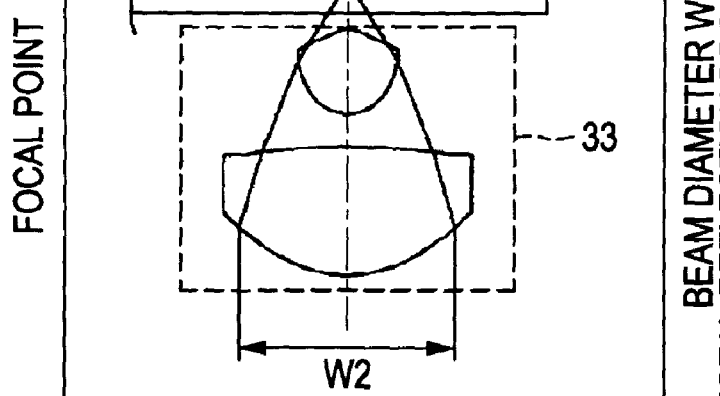
Figure 8C:
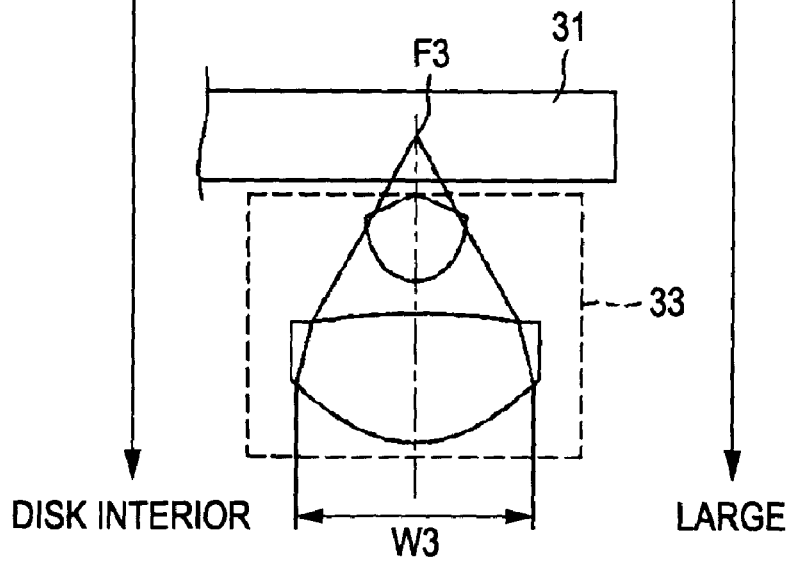

The operation of the expander lens as the focus adjusting section 35 will be described more specifically with reference to FIGS. 4 and 8. By driving the actuator 35c shown in FIG. 4 by the step motor 45 so as to very the lens-to-lens distance D of the expander lens 35, the focus position F can be changed as shown in FIGS. 8A to 8C. FIG. 8A illustrates a case where the focus of evanescent light is set as a focus F1 on the disk surface. The beam diameter of total-reflection return light in this case is taken as W1. In FIG. 8B, the focus of evanescent light is set as a focus F2 located more inward toward the disk interior in comparison to that in FIG. 8A. The beam diameter of total-reflection return light in this case is taken as W2. Further, the focus of evanescent light is set as a focus F3 located more inward toward the disk interior in comparison to that in FIG. 8B. The beam diameter of total-reflection return light in this case is taken as W3. Therefore, the size relation between the respective total-reflection return light beam diameters is W3>W2>W1.

As the beam diameter of total-reflection return light changes, the light-receiving area in the light-receiving region on the second detector 39 changes in accordance with the size of the beam diameter. Therefore, as shown in FIG. 9, the total-reflection return light quantity varies on the basis of a difference in focus position with respect to the disk thickness direction. FIG. 9 is a characteristic diagram showing a variation in total-reflection return light quantity at the time of focus adjustment by the expander lens 35.

FIG. 9 shows a total of three characteristic curves indicative of total-reflection return light quantity when the beam diameter of total-reflection return light is W1, W2, and W3. When the level of total-reflection return light quantity varies as shown in FIG. 9, the gap length to be controlled relative to the same target value 0.4 varies. Although originally a gap length X=20 nm uniquely corresponded to the target value 0.4, among the total of three characteristic curves indicative of total-reflection return light quantity when the beam diameter of total-reflection return light is W1, W2, and W3, other than the gap value of 20 nm, a gap value in the vicinity of 20 nm, for example, 18 nm or 22 nm becomes the gap value corresponding to the target value 0.4. Accordingly, it is necessary to keep the level of total-reflection return light quantity constant irrespective of focus adjustment in the focus adjusting section 35.

Figure 10:
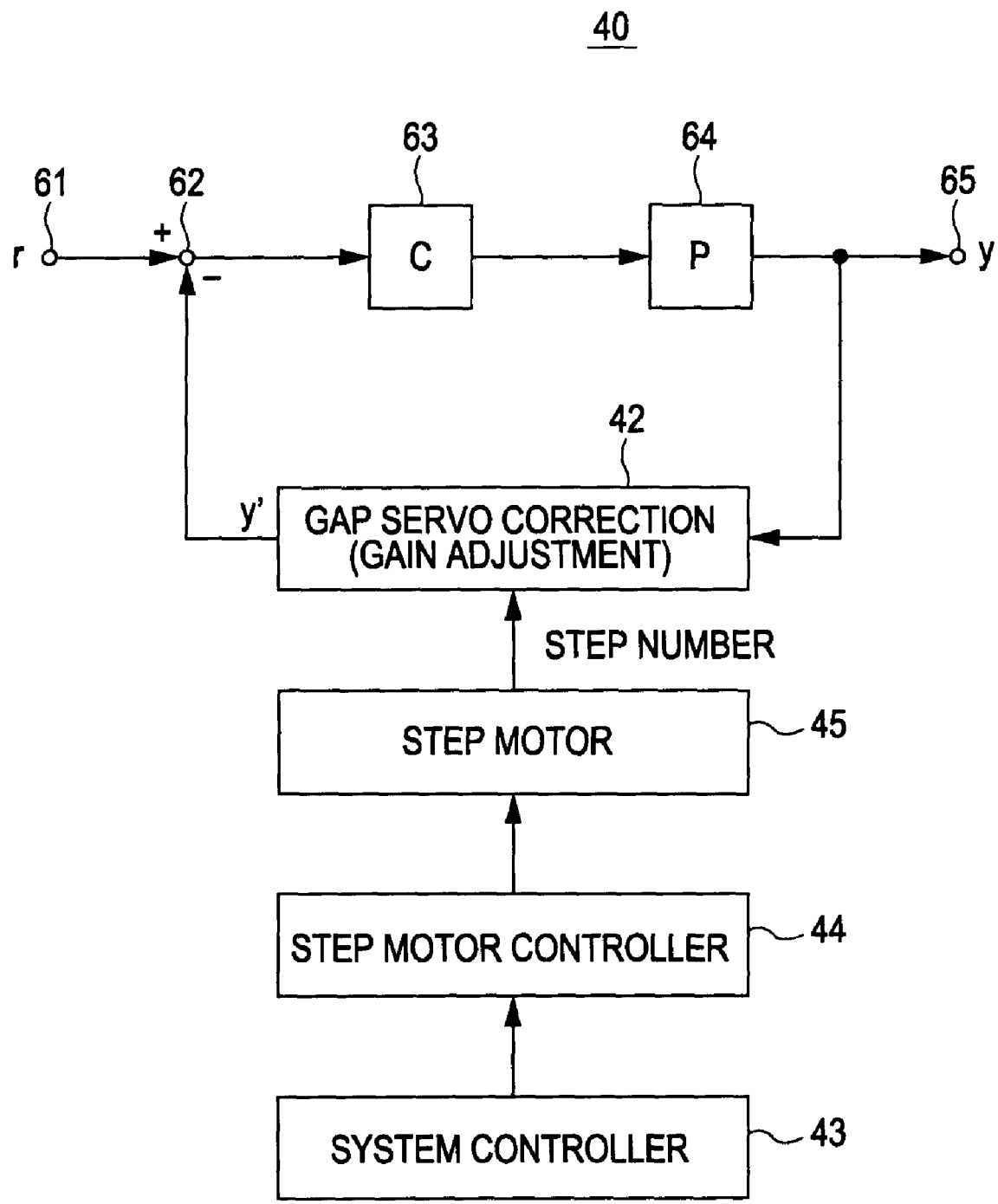
FIG. 10 is a configuration diagram of a gap servo section incorporating a gap servo correcting section.

FIG. 10 shows a gap servo loop incorporating the configuration for achieving this. The difference from the gap servo section 40' shown in FIG. 6 resides in the incorporation of the gap servo correcting section 42 in the feedback path. Symbol r denotes a target value (corresponding to 0.4 shown in FIG. 6) supplied to an input terminal 61, symbol C denotes a controller (for example, a PID or phase-lead compensation) 63, symbol P denotes an actuator 64, and symbol y denotes the quantity of total-reflection return light that is outputted from an output terminal 65 and returned to the gap servo correcting section 42 via the feedback path. The gap servo correcting section 42 keeps the gap constant at the target value by using the total-reflection return light quantity y. The details of this operation are as follows. The difference between the target value r and the total-reflection return light quantity y is calculated by a subtracter 62, and this is inputted to the controller 63 as a deviation. With the output of the controller 63 as a controlled variable, the actuator 64 with the objective lens group (two-group lens) 33 as a control target built therein, for example, a piezoelectric element is driven, thereby making the total-reflection return light quantity y conform to the control target value r that is constant.

At the time when the focus adjusting section 35 adjusts the focus of near-field light radiated onto the optical disk 31 of the optical head 49 in a state where gap servo is being performed by the gap servo section 40, the gap servo correcting section 42 corrects the gap servo by the gap servo section 40.

A predetermined step number is supplied to the gap servo correcting section 42 from the step motor 45. The step motor 45 is controlled by the step motor controller 44. Further, the step motor controller 44 is controlled by the system controller 43.

The gap servo incorporating the gap servo correcting section 42 will be described with reference to the flow chart of FIG. 11 and the configuration diagram of FIG. 12. This procedure assumes that gap servo is already being performed by the gap servo section 40. First, when it is determined in step S21 that focus adjustment is to be performed (YES) by the system controller 43, the system controller 43 inputs a step number to the focus adjusting section 35 shown in FIG. 1 via the step motor controller 44. At the same time, the system controller 43 also inputs a driving step number of expander lens to an input terminal 421 of the gap servo correcting section 42. The step number of expander lens is supplied to a step number/address conversion table 421 (step S22).

The step number/address conversion table 421 converts a step number into an address (step S23). As shown in FIG. 13, the step number/address conversion table 421 stores step numbers and addresses in association with each other. Accordingly, a step number can be converted into an address by using the step number/address conversion table 421. For example, in the conversion table 421, step number 0 corresponds to an address 000, step number 1 corresponds to address 001, step number 100 corresponds to address 064, and step number 1000 corresponds to address 3E8.

The gap servo correcting section 42 inputs an address from the step number/address conversion table 421 to a memory 422 that stores normalized gain values corresponding to amounts of expander movement, thus obtaining a normalized gain 423 (step S24). A specific example of addresses and gains stored in the memory 422 is shown in FIG. 14. Normalized gain 0.000 is set in correspondence to address 000. Further, gain 0.001 is set in correspondence to address 001, gain 0.900 is set in correspondence to address 064, and gain 1.200 is set in correspondence to address 3E8.

Figure 15:
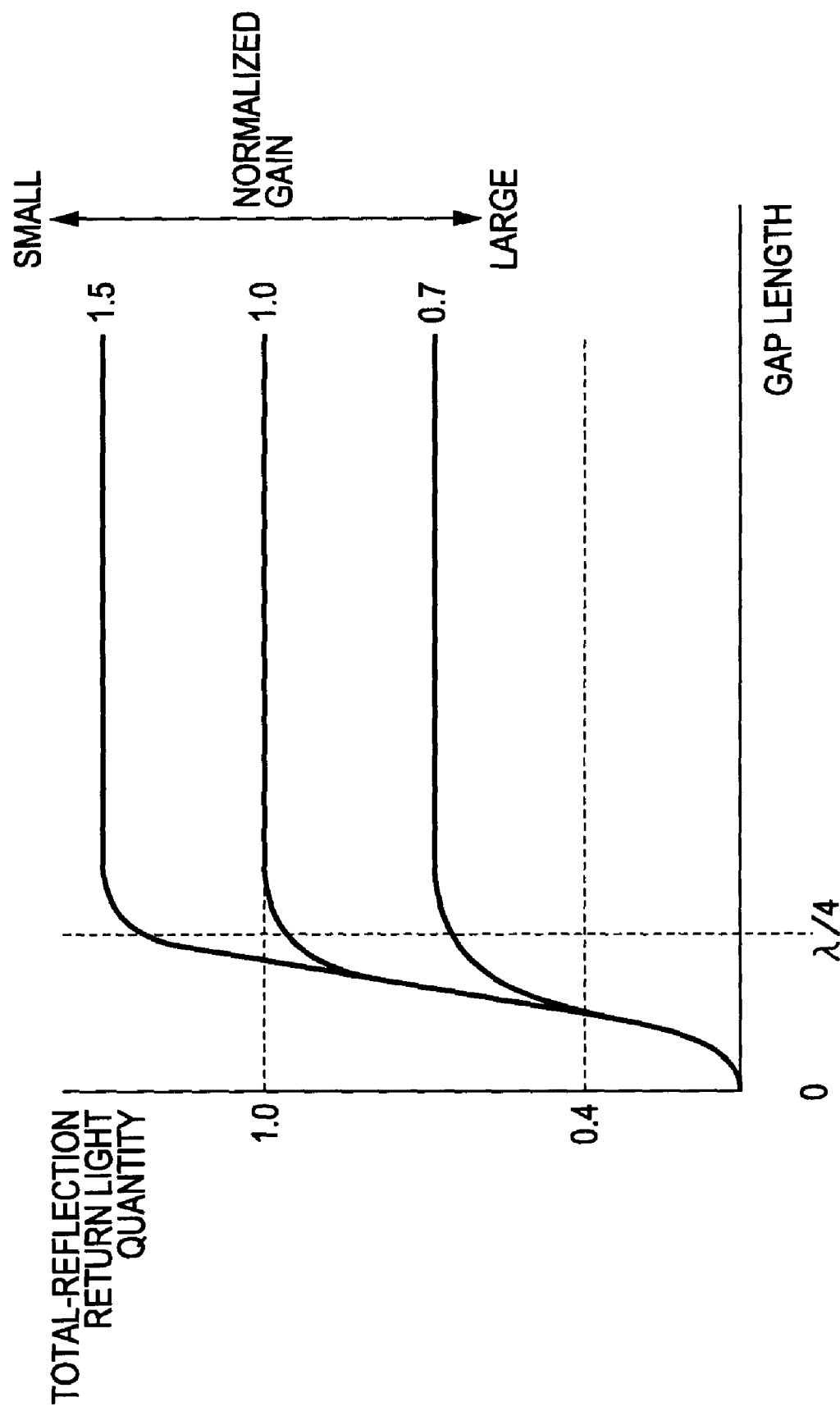
FIG. 15 is a characteristic diagram showing characteristics when the total-reflection return light quantity is 1.5, 1.0, and 0.7.

FIG. 15 shows the characteristics when total-reflection return light quantity is 1.5, 1.0, and 0.7. The total-reflection return light quantity becomes, for example, 1.5 when the normalized gain is small, becomes 1.0 when the normalized gain is intermediate, and becomes 0.7 when the normalized gain is large, so the characteristic of total-reflection return light quantity varies. By multiplying total-reflection return light y separately inputted from an input terminal 424 by the gain 423 outputted from the memory 422, a normalized (not dependent on the expander position) total-reflection return light quantity y' can be obtained (step S25).

For instance, in FIG. 15, when the expander is adjusted to a position where y=1.5, by multiplying y by a gain corresponding to 1/1.5, the total-reflection return light quantity y' after normalization becomes 1.0. Likewise, when the expander is located at a position where y'=0.7, by multiplying y by a gain corresponding to 1/0.7, the total-reflection return light quantity y' after normalization becomes 1.0. Accordingly, the total-reflection return light quantity can be kept always constant at 1.0 at far field position irrespective of expander adjustment.

Figure 11:
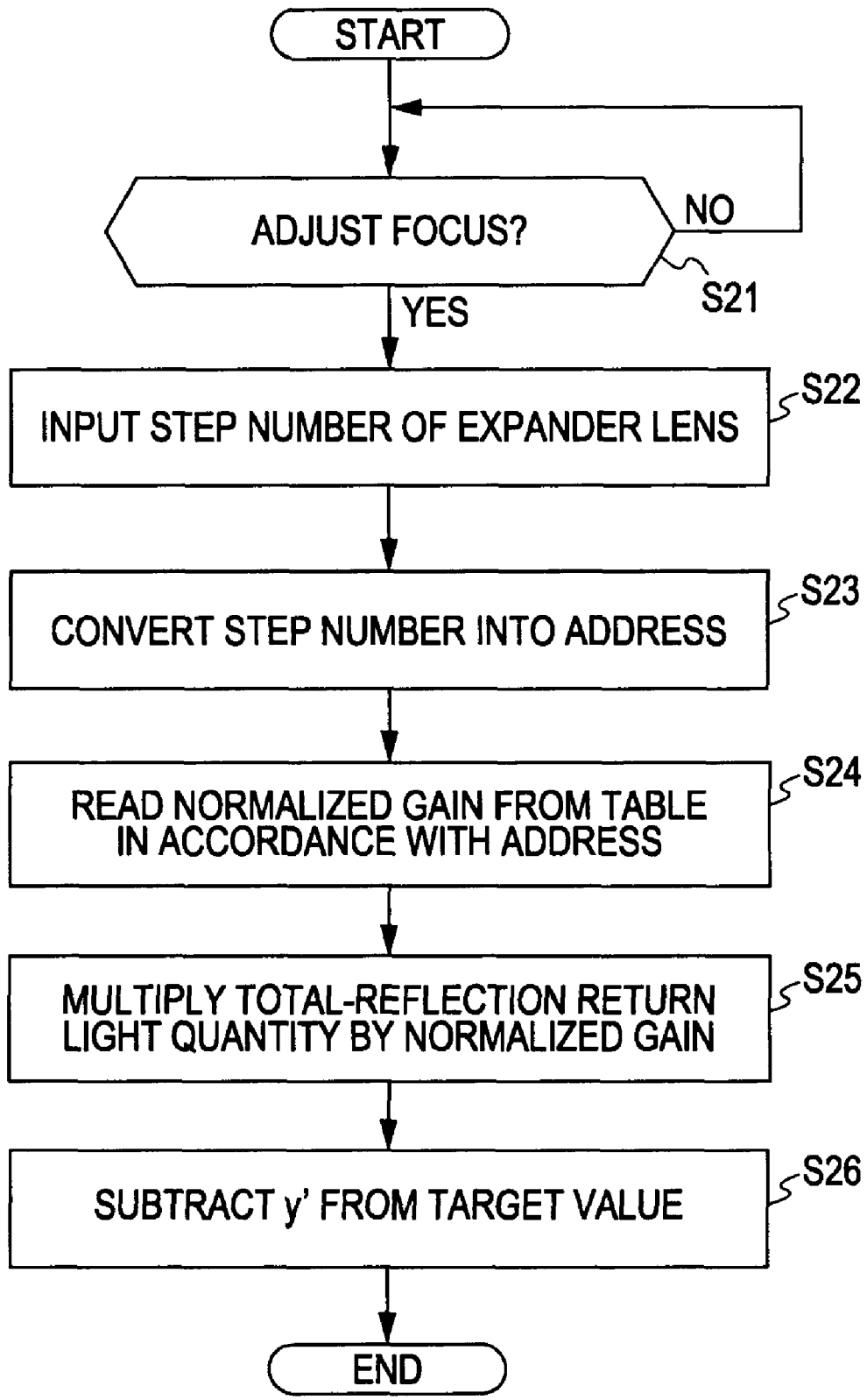
FIG. 11 is a flow chart showing the procedure of processing by a gap servo correcting section.
Figure 12:
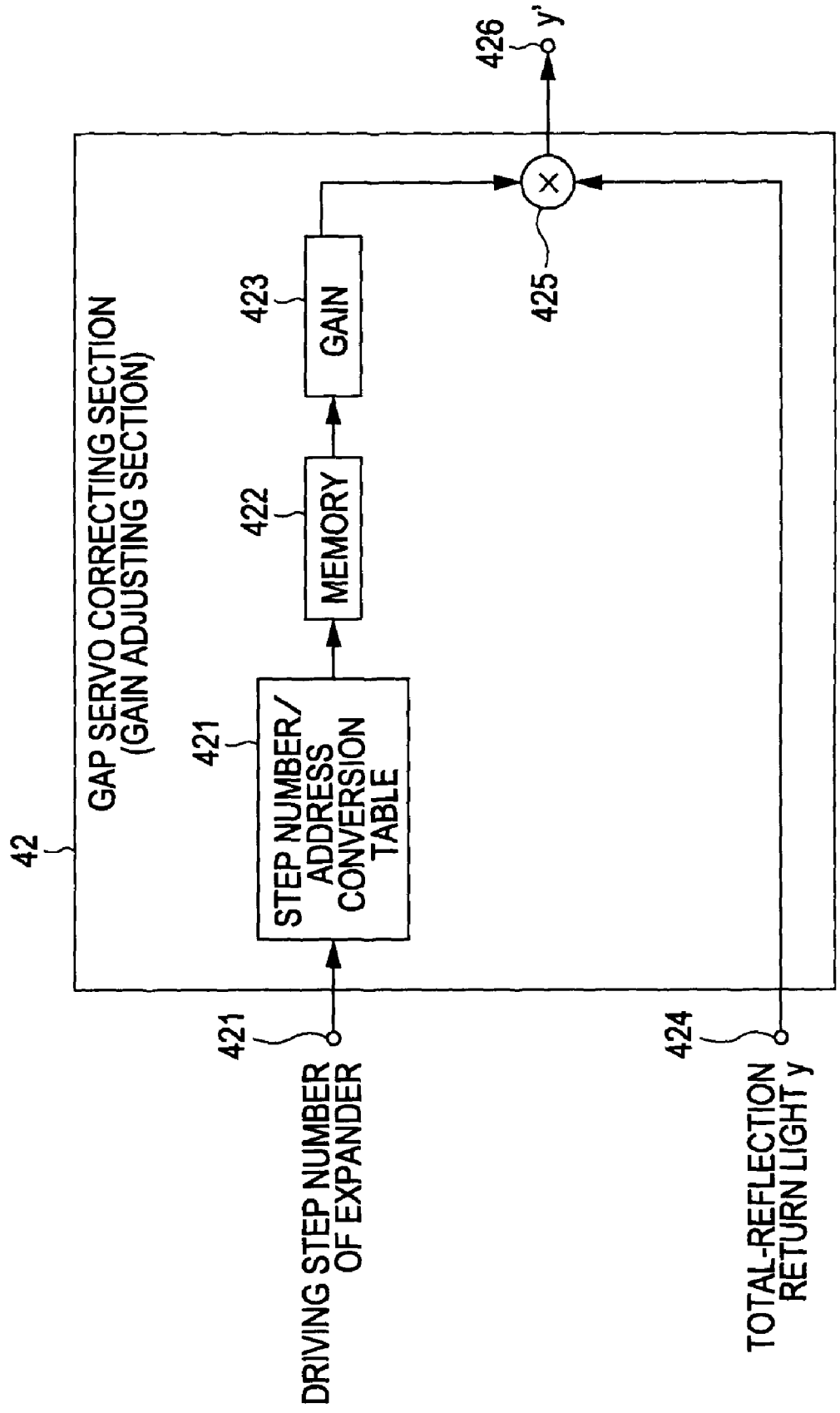
FIG. 12 is a detailed configuration diagram of a gap servo correcting section.

In FIG. 11, in step S26, the total-reflection return light quantity y' after normalization is subtracted from the target value by the subtracter 62. A gap error signal with the influence of focus adjustment suppressed is thus supplied to the controller 63.

As described above, the normalized total-reflection return light quantity y' becomes as shown in FIG. 5 irrespective of focus adjustment in the expander. As a result, the gap length is kept constant even when the expander is moved.

The tracking servo section 41 shown in FIG. 1 controls the tracking of the optical head 49 with respect to the recording track on the optical disk 31 in a state where gap servo is being performed by the gap servo section 40. In accordance with a tracking error signal obtained on the basis of a detection output of the second detector 39, the tracking servo section 41 performs tracking with respect to the optical head 49, more specifically with respect to the track of near-field light radiated from the SIL 33b of the objective lens group 33. If the second detector 39 has two split detection regions, a tracking error is obtained as a push-pull signal of these regions as described above.

It should be noted that the present invention is also applicable to a near-field optical disk recording apparatus that records signals onto a disk-shaped recording medium by use of near-field light. Specifically, this disk recording apparatus is a so-called cutting machine that radiates laser light, which has been modulated in accordance with recording information, to the surface of a resistor-coated glass master to thereby perform cutting/recording of the recording information. As shown in FIG. 16, this signal recording apparatus has an information source 1, a recording signal generator 2, an acousto-optical element (AOM) 3, a laser element 4, an electric-optic conversion element (EOM) 5, an analyzer 6, a beam slitter (BS) 7, photodetectors 8, 18, an automatic power controller (APC) 9, a mirror 10, condenser lenses 11, 17, a collimator lens 12, a polarization beam splitter (PBS) 13, a ¼ wavelength plate (λ/4 plate) 14, an optical head 15, a glass master 16, a gap servo section 24, a tracking servo section 25, a gap servo correcting section 26, a system controller 27, a step motor controller 28, and a step motor 29.

Of these components, the laser element 4 is a light source for emitting laser light radiated to the glass master 16 serving as an object to be irradiated (optical recording medium). The optical head 15 is optical means arranged in close proximity to the glass master 16, for condensing near-field light due to laser light onto the glass master 16.

The gap servo section 24 is gap control means for controlling the distance between the optical head 15 and the glass master 16 in accordance with the return light quantity (total-reflection light quantity). The gap servo section 24 controls the distance between the optical head 15 and the glass master 16 to be constant in accordance with the quantity of return light from the optical head 15 having an objective lens group.

The tracking servo section 25 controls the tracking of the optical head 15 with respect to the recording track on the glass master 16 in a state where gap servo is being performed by the gap servo section 24.

By means of the configuration and operation described above with reference to FIGS. 10 to 15, the gap servo correcting section 26 corrects gap servo by the gap servo section 24 when the focus adjusting section adjusts the focus of near-field light radiated onto the optical disk of the optical head 15 in a state where the gap servo is being performed by the gap servo section 24.

The operation of the near-field optical disk recording apparatus will now be described in detail along the flow of laser light and a signal. In this signal recording apparatus, when recording a signal onto the glass master 16, recording laser light LB1 emitted from the laser element 4 and made incident on the acousto-optical element (AOM) 3 via the electric-optic conversion element (EOM) 5, the analyzer 6 as a polarization plate, and the beam splitter (BS) 7 is modulated in the AOM 3. Specifically, information from the information source 1 is previously inputted to the AOM 3 after being digitized in the recording signal generator 2, and the AOM 3 modulates the recording laser light LB1, which has been made incident on the AOM 3 as described above, in accordance with the thus digitized information recording signal. Next, the laser light LB2 thus modulated by the AOM 3 is reflected by the first mirror 10, and changed into parallel beams as it passes through the condenser lens 11 and the collimator lens 12. The parallel beams then pass through the polarization beam splitter (PBS) 13 before being made incident on the λ/4 plate 14.

The incident light is changed into circularly polarized light by the λ/4 plate 14, and the modulated light LB3 thus changed into circularly polarized light is reflected by the second mirror 10 to be made incident on the optical head 15. The optical head 15 radiates the circularly polarized laser light to the resistor-coated glass master 16 in a spot form. The optical head 15 used is, for example, an SIL (Solid Immersion Lens) formed by a two-group lens. In this signal recording apparatus, by adopting an SIL for the optical head 15, it is possible to make the spot light finer for signal recording by utilizing near-field light generated in the near-field condition.

As described above, the gap between the glass master 16 and the optical head 15 is controlled by the gap servo section 24, so the distance between the glass master 16 and the optical head 15 is kept constant. Accordingly, laser light LB4 incident on the optical head 15 forms a light spot whose size is controlled to be constant on the resistor-coated glass master 16. Due to this light spot, the resistor-coated glass master 16 is cut in accordance with recording information.

This signal recording apparatus also performs the following processing for gap control while cutting the glass master 16 as described above. First, laser light LB6 used for recording as a part of laser light emitted from the laser element 4 and having passed through the EOM 5, the analyzer 6, and the beam splitter 7 is detected by the first photodetector (PD1) 8. The laser light LB6 incident on the first photodetector (PD1) 8 is converted into an electrical signal at this time and made incident on the automatic power controller (APC) 9, and the value thereof is fed back to the EOM 5, so the laser power outputted from the laser element 4 is controlled to be constant.

On the other hand, the total-reflection return light from the optical head 15 with respect to the laser light LB4 is converted into linearly polarized light as it passes through the λ/4 plate 14, and is then reflected by the reflecting surface of the polarization beam splitter 13 before being further reflected by the third mirror 10 to be inputted to the condenser lens 17. This is detected by the second photodetector (PD2) 18 as the light quantity of the total-reflection return light LB5 (hereinafter, referred to as the total-reflection return light quantity) that has passed through the condenser lens 17. The total-reflection return light quantity (signal) detected at this time is used for gap servo as described above.

The total-reflection return light quantity is inputted to the gap servo section 24. With a reference signal generated by an internal constant voltage source as a target control value, and the total-reflection return light quantity after demodulation as a controlled variable, the gap servo section 24 outputs a gap control voltage on the bases of these pieces of information. Then, this gap control voltage is inputted to the optical head 15. The optical head 15 is mounted to a piezoelectric element, and the piezoelectric element is controlled so as to expand and contract in accordance with the gap control voltage, thereby controlling the distance between the optical head 15 and the glass master 16.

The tracking servo section 25 controls the tracking of the optical head 15 with respect to the recording track on the optical disk in a state where gap servo is being performed by the gap servo section 24. In accordance with a tracking error signal obtained on the basis of a detection output of the second detector 18, the tracking servo section 25 performs tracking with respect to the optical head 15, more specifically with respect to the track of near-field light radiated from the SIL of the objective lens group. If the second detector 18 has two split detection regions, a tracking error is obtained as a push-pull signal of these regions as described above.

If there is a defect (dust or flaw) on the optical disk 31 or 16, spikes 61 (61a and 61b), 62 (62a and 62b), and 63 (63a and 63b) occur in the gap error signal appearing on the graph of the total-reflection return light quantity taken along the vertical axis in FIG. 17. When these spikes are occurring, there is a possibility that the SIL end face may come into collision against the disk. In view of this, the near-field optical disk reproducing apparatus and recording apparatus according to this embodiment may adopt a configuration for avoiding collision between the SIL end face and the disk.

Figure 18A:
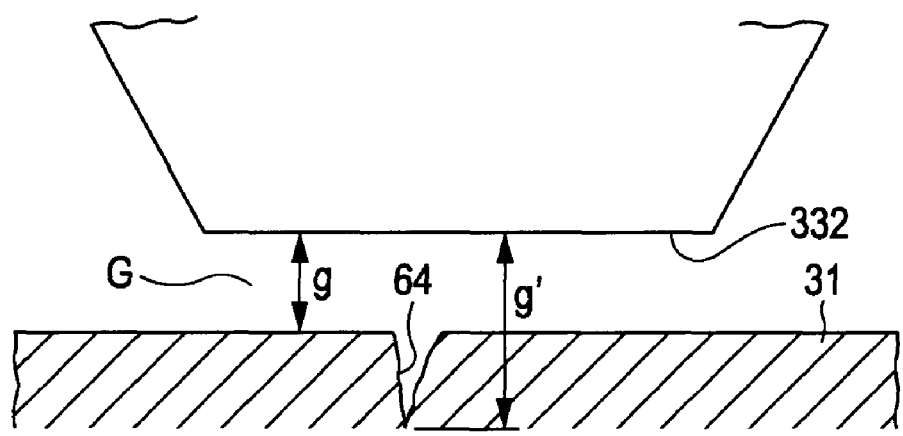
FIGS. 18A and 18B are diagrams showing a flaw on an optical disk and an attack portion due to the flaw.
Figure 18B:
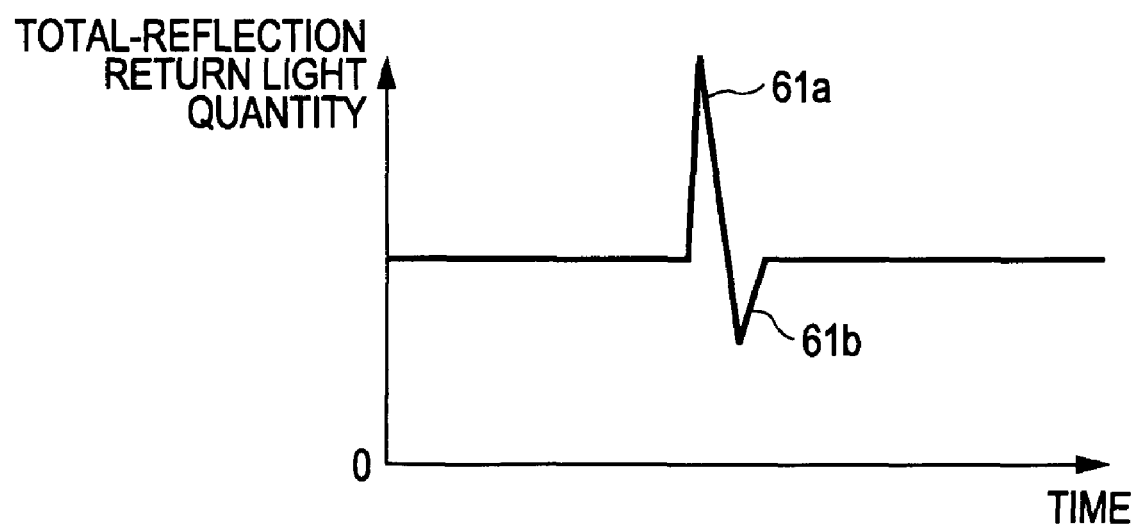

FIG. 18A shows a flaw 64 on the disk 31. If there is no flaw 64, the size (distance) of the gap G between the end face 332 of the SIL 33b and the disk 31 is g. However, if the flaw 64 is present on the disk 31, the size of the gap G between the end face 332 of the SIL 33b and the disk 31 becomes g'. Of course, g'>g. According to the characteristic diagram shown in FIG. 5, when the gap error becomes larger than x that is, for example, 20 nm, the total-reflection light quantity becomes larger than 0.4, producing the spike 61a in the upward direction as shown in FIG. 18B. In the downward direction, an overshoot 61b appears in reaction to the spike.

Figure 19A:
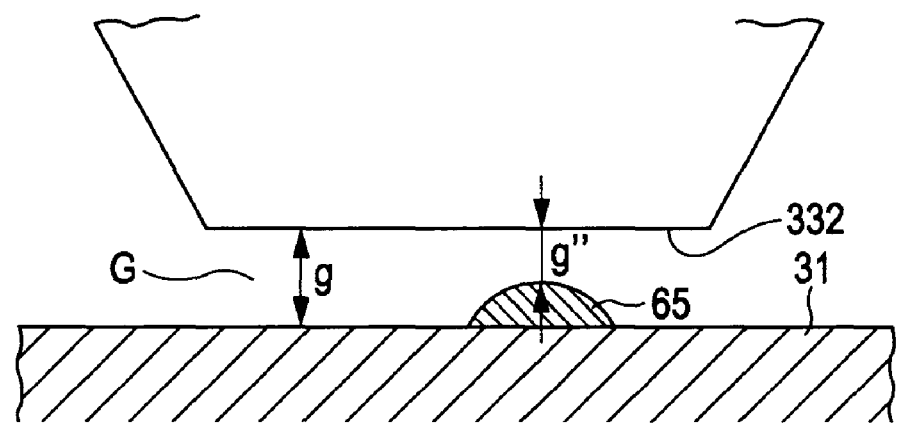
FIGS. 19A and 19B are diagrams showing a defect on an optical disk and an attack portion due to the defect.
Figure 19B:
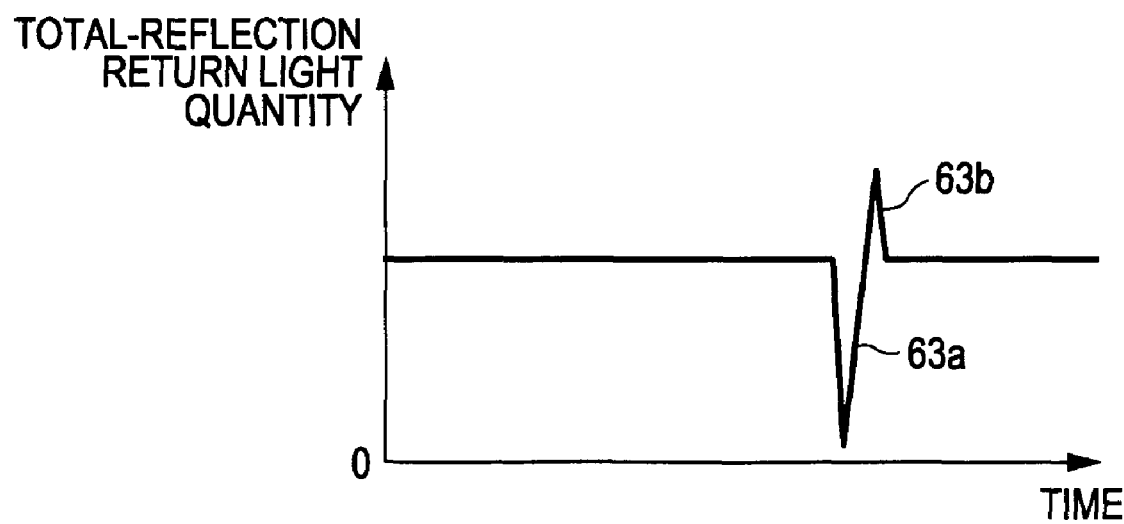

FIG. 19A shows dust 65 on the disk 31. If there is no dust 65, the size (distance) of the gap G between the end face 332 of the SIL 33b and the disk 31 is g. However, if the dust 65 is present on the disk 31, the size of the gap G between the end face 332 of the SIL 33b and the disk 31 becomes g". Of course, g"<g. According to the characteristic diagram shown in FIG. 5, when the gap error becomes smaller than x that is, for example, 20 nm, the total-reflection light quantity becomes smaller than 0.4, producing the spike 63a in the downward direction as shown in FIG. 19B. In the upward direction, an overshoot 63b appears in reaction to the spike 63a.

The above-described phenomenon occurring when there is flaw or dust on the disk is related to the principle of determination by a defect determiner that will be described later. That is, if the flaw 64 is present on the disk, at the location of the flaw 64, the distance between the SIL 33b and the disk 31 becomes g' that is larger than g, so the gap error becomes large. On the other hand, if the dust 65 is present on the disk, at the location of the dust 65, the distance between the SIL 33b and the disk 31 becomes g" that is smaller than g, so the gap error becomes small. The defect determiner determines the presence of a defect in accordance with the number of times a variation in the gap error corresponding to a spike portion exceeds a predetermined threshold. This will be described in detail later.

There is a possibility of collision occurring between the SIL 33b and the disk 31 at the portions of the upward and downward spikes shown in FIGS. 17 and 18. If such collision occurs, this may cause damage to the lens or media.

In this embodiment, the above-mentioned spike portions are detected by the defect determiner that will be described later, and if there is a fear of the SIL coming into collision against the disk to cause damage to the lens or media, gap servo is forcibly turned off.

FIG. 20 is a block diagram showing the gap servo section 40 incorporating a defect determiner 77. This block diagram shows the detailed configuration of the gap servo section 40 used in the near-field optical disk apparatus according to this embodiment shown in FIG. 1. The gap servo section 40 performs gap servo on the basis of the number of times the occurrence of a defect on the optical disk 31 is determined.

In FIG. 20, symbol r denotes a target value (corresponding to 0.4 shown in FIG. 5) supplied to an input terminal 71, symbol C denotes a controller (for example, a PID or phase-lead compensation) 73, symbol P denotes an actuator 75, and symbol y denotes the quantity of total-reflection return light that is outputted from an output terminal 76 and supplied to the defect determiner 77 via a feedback path 78. The defect determiner 77 determines the occurrence of a defect such as a flaw or dust on the optical disk 31 by using the total-reflection return light quantity y. The defect determiner 77 controls the ON/OFF of a selector switch 74 on the basis of the number of times the occurrence of a defect is determined.

The total-reflection return light quantity y is fed back to the target value r via the defect determiner 77 and a subtracter 72, thereby making it possible to keep the gap constant. The details of this operation are as follows. The difference between the target value r and the total-reflection return light quantity y is calculated by the subtracter 72, and this is inputted to the controller 73 as a deviation. With the output of the controller 73 as a controlled variable, the actuator with the objective lens group (two-group lens) 33 as a control target built therein, for example, a piezoelectric element is driven, thereby making the total-reflection return light quantity y conform to the control target value r that is constant.

The selector switch 74 provided between the controller 73 and the actuator 75 is turned ON/OFF on the basis of the determination result of the defect determiner 77, thus avoiding collision of the SIL lens against the optical disk to reduce lens damage.

The determination result of the defect determiner 77 may be supplied to the system control section so that the system control section controls the ON/OFF of the selector switch 74 on the basis of the number of times the occurrence of a defect is determined by the defect determiner.

Figure 21:
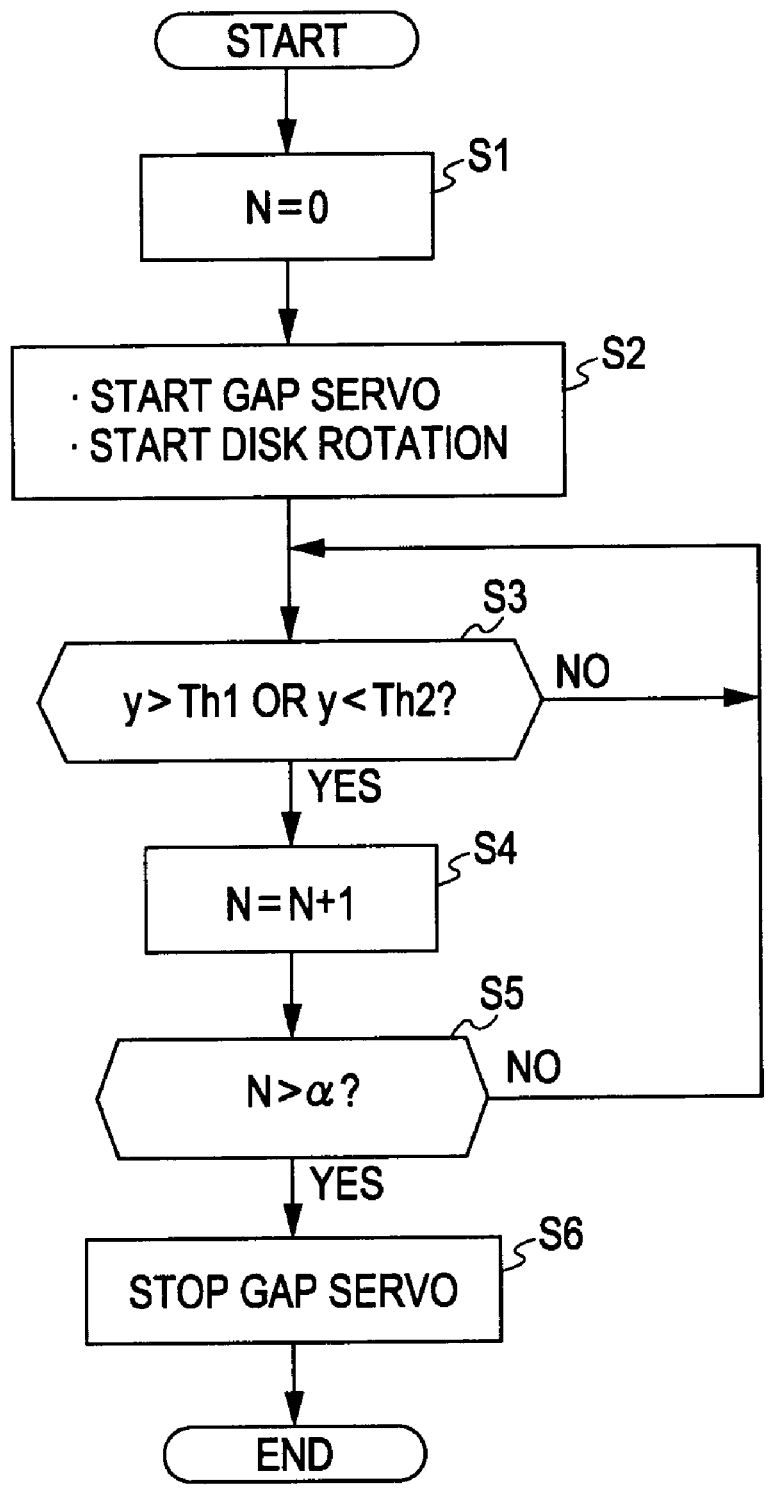
FIG. 21 is a flow chart showing defect determination processing in a gap servo section.

FIG. 21 is a flow chart illustrating the procedure of processing by the defect determiner 77. First, in step S1, the defect counter is initialized (N=0). Next, gap servo is started, and also disk rotation is started (step S2). It does not matter what the order of gap servo and disk rotation is.

Next, it is determined in step S3 whether the total-reflection return light quantity y is larger than a threshold Th1, or whether the total-reflection return light quantity y is smaller than a threshold Th2. This is to detect that the upward or downward spike portions or overshoots thereof described above with reference to FIGS. 17 and 18 have exceeded these thresholds Th1 and Th2. The threshold Th1 is a reference value (predetermined value) for detecting the influence of a flaw on the disk, and it is determined whether or not there is a spike portion whose peak has exceeded the threshold Th1. Further, the threshold Th2 is a reference value (predetermined value) for detecting the influence of dust on the disk, and it is determined whether or not there is a spike portion whose peak is smaller than the threshold Th2.

That is, the threshold Th1 is used to detect the influence of a flaw on the disk, and the threshold Th2 is used to detect the influence of dust on the disk. As described above, if there is a flaw on the disk, the distance between the SIL end face and the disk becomes large (far) at the location of the flaw, so the gap error becomes large. On the other hand, if there is dust on the disk, the distance between the SIL end face and the disk becomes small (short) at the location of the dust, so the gap error becomes small.

Figure 22:
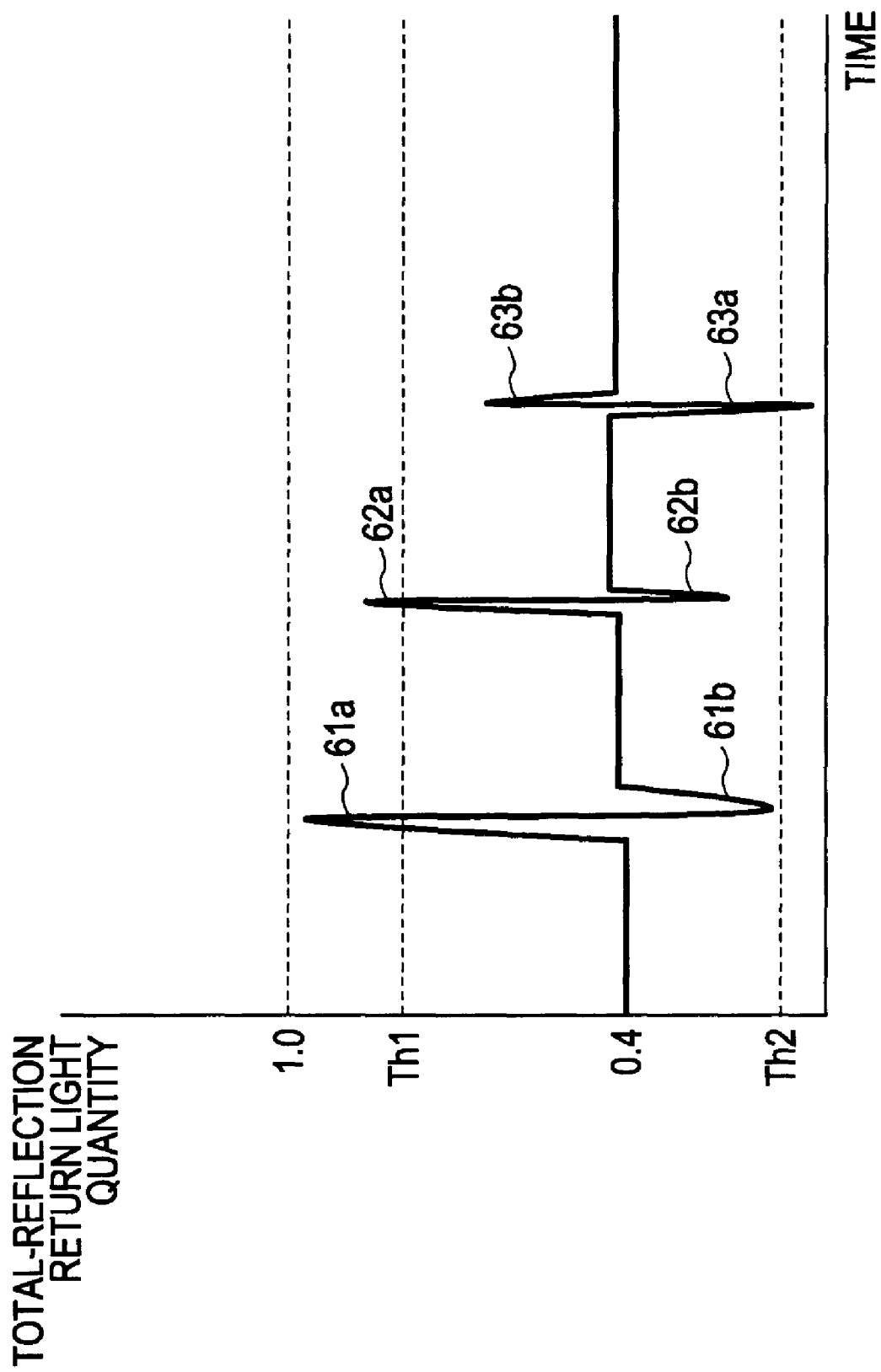
FIG. 22 is a diagram showing the setting of thresholds.

As shown in FIG. 22, the defect determiner 77 determines that there is an influence of a defect if the gap error 61a or the like is larger than the threshold Th1 or if the error 63a or the like is smaller than the threshold Th2, and increments a defect counter value N by 1(N+1) in step S4. Further, the defect determiner 77 sets a predetermined defect counter threshold α in step S5. If the counter value N is smaller than the defect counter threshold α, the defect determiner 77 determines that the influence of a defect is small, and keeps the selector switch 74 ON to continue gap servo as it is. On the other hand, if the counter value N is larger than the defect counter threshold α, the defect determiner 77 determines that the influence of a defect is large, and turns the selector switch 74 OFF to stop the gap servo (step S6).

As described above, in the near-field optical disk apparatus, the gap between the SIL end face and the optical disk is only 20 nm, for example. Accordingly, for example, when dust such as dirt temporarily adheres onto the disk, the total-reflection return light quantity soon exceeds or falls below the threshold Th1 or Th2 in step S3. If gap servo is stopped in this case, such stoppage of gap servo may become frequent. This is why the setting of and comparison against the defect counter threshold α in step S5 become necessary. For example, the defect counter threshold α may be a reference value per 100 tracks or a reference value during the period of time until the reproduction of one disk is finished. Alternatively, the defect counter threshold α may be a reference value during a period of time from the start of gap servo to the end of the gap servo.

Next, description will be further given of an example of improvement to the tracking servo performed by the near-field optical disk apparatus according to this embodiment. As described above, the tracking servo section 41 shown in FIG. 1 controls the tracking of the optical head 49 with respect to the recording track on the optical disk 31 in a state where gap servo is being performed by the gap servo section 40.

Figure 23:
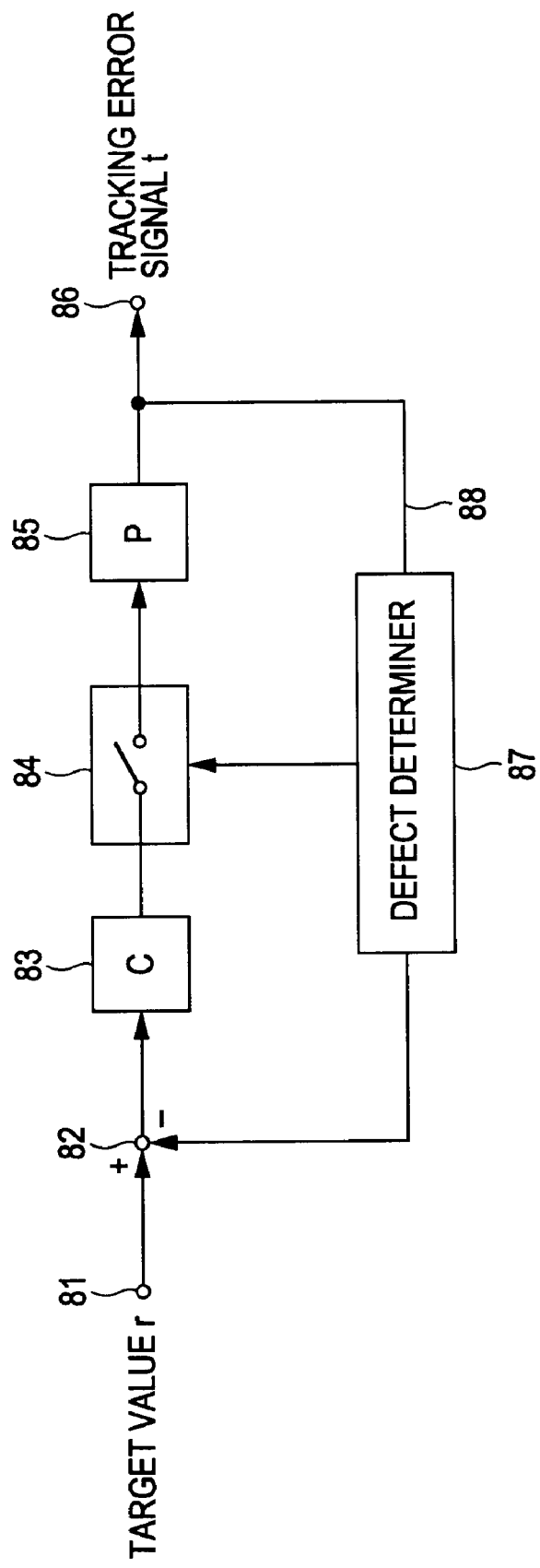
FIG. 23 is a detailed configuration diagram of a tracking servo section.

FIG. 23 is a block diagram of the tracking servo section 41. The tracking servo section 41 has a defect determiner 87, and performs tracking servo on the basis of the number of times the occurrence of a defect on the optical disk 31 is determined. When, during operation of tracking servo, the number of times a tracking error signal exceeds a preset threshold has exceeded a predetermined number of times, the tracking servo is forcibly turned OFF. This provides the effect of reducing damage occurring due to collision of the lens against the disk.

In FIG. 23, symbol r denotes a tracking error target value supplied to an input terminal 81, which is, for example, 0.0. Symbol C denotes a controller (for example, a PID or phase-lead compensation) 83, symbol P denotes an actuator 85, and symbol t denotes a tracking error signal outputted from an output terminal 86 and supplied to the defect determiner 87 via a feedback path 88. The defect determiner 87 determines the occurrence of a defect such as a flaw or dust on the optical disk 31 by using the tracking error signal t. The defect determiner 87 controls the ON/OFF of a selector switch 84 on the basis of the number of times the occurrence of a defect is determined.

The tracking error signal t is fed back to the target value r via the defect determiner 87 and a subtracter 82, thereby making it possible to keep the tracking error constant (0.0). The details of this operation are as follows. The difference between the target value r and the tracking error signal t is calculated by the subtracter 82, and this is inputted to the controller 83 as a deviation. With the output of the controller 83 as a controlled variable, the actuator with the objective lens group (two-group lens) 33 as a control target built therein, for example, a piezoelectric element is driven, thereby making the tracking error signal t conform to the control target value r that is constant.

The selector switch 84 provided between the controller 83 and the actuator 85 is turned ON/OFF on the basis of the determination result of the defect determiner 87, thus avoiding collision of the SIL lens against the optical disk to reduce lens damage.

The determination result of the defect determiner 87 may be supplied to the system control section so that the system control section controls the ON/OFF of the selector switch 84 on the basis of the number of times the occurrence of a defect is determined by the defect determiner.

Figure 24:
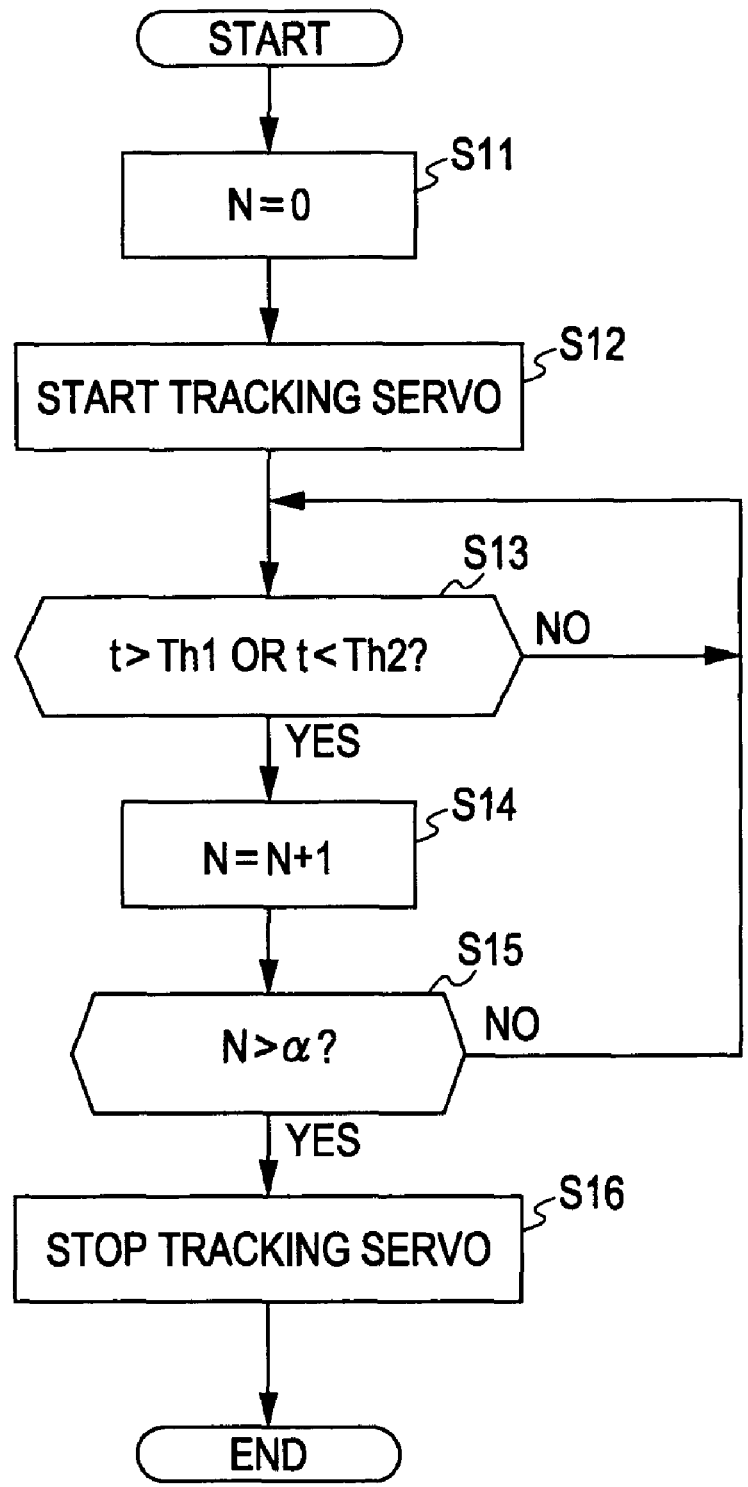
FIG. 24 is a flow chart showing the procedure of defect determination processing in a tracking servo section.

FIG. 24 is a flow chart illustrating the procedure of processing by the defect determiner 87. This procedure assumes that gap servo is already being performed by the gap servo section 38. First, in step S11, the defect counter is initialized (N=0). Next, gap servo is started (step S12).

Next, it is determined in step S3 whether the tracking error signal t is larger than a threshold Th1 as shown in FIG. 25, or whether the tracking error signal t is smaller than a threshold Th2. This is to detect that upward or downward spike portions occurring due to a flaw or dust on the optical disk 31 or overshoots thereof have exceeded these thresholds Th1 and Th2. The threshold Th1 is a reference value (predetermined value) for detecting the influence of a flaw on the disk, and it is determined whether or not there is a spike portion whose peak has exceeded the threshold Th1. Further, the threshold Th2 is a reference value (predetermined value) for detecting the influence of dust on the disk, and it is determined whether or not there is a spike portion whose peak is smaller than the threshold Th2.

The defect determiner 87 determines that there is an influence of a defect if the tracking error signal t is larger than the threshold Th1 or is smaller than the threshold Th2, and increments a defect counter value N by 1 (N+1) in step S14. Further, the defect determiner 87 sets a predetermined defect counter threshold α in step S15. If the counter value N is smaller than the defect counter threshold α, the defect determiner 87 determines that the influence of a defect is small, and keeps the selector switch 84 ON to continue tracking servo as it is. On the other hand, if the counter value N is larger than the defect counter threshold α, the defect determiner 87 determines that the influence of a defect is large, and turns the selector switch 84 OFF to stop the tracking servo (step S16).

It should be noted that the tracking servo by the tracking servo section 41 is performed under the assumption that gap servo is already being performed, and no tracking servo is performed unless gap servo is on. However, gap servo is executed even in a state where tracking servo is not being performed, that is, a state where tracking servo is off. This means that as viewed from the gap servo section 40 side, gap servo is performed independently from tracking servo.

The above-described gap servo section 40 and tracking servo section 41 configured so as to avoid collision between the lens and the disk are also applicable to the near-field optical disk recording apparatus shown in FIG. 16.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk apparatus which performs recording and/or reproduction of information with respect to an optical recording medium by using near-field light, comprising:
   a light source that emits laser light;
   optical means including an objective lens group positioned in close proximity to the optical recording medium to generate near-field light from laser light emitted from the light source;
   gap servo means for controlling a gap between the optical recording medium and the optical means on the basis of a return light quantity of the laser light via the optical means;
   focus adjusting means for adjusting focus of the near-field light radiated onto the optical recording medium of the optical means, in a state where gap servo is being performed by the gap servo means; and
   gap servo correcting means for correcting the gap servo by the gap servo means when focus of the near-field light is adjusted by the focus adjusting means, the gap servo correcting means multiplies a gap error signal for the gap servo by a normalized gain in accordance with an adjustment amount of the focus adjusting means.

2. An optical disk apparatus which performs recording and/or reproduction of information with respect to an optical recording medium by using near-field light, comprising:
   a light source that emits laser light;
   optical means including an objective lens group positioned in close proximity to the optical recording medium to generate near-field light from laser light emitted from the light source;
   gap servo means for controlling a gap between the optical recording medium and the optical means on the basis of a return light quantity of the laser light via the optical means;
   focus adjusting means for adjusting focus of the near-field light radiated onto the optical recording medium of the optical means, in a state where gap servo is being performed by the gap servo means; and
   gap servo correcting means for correcting the gap servo by the gap servo means when focus of the near-field light is adjusted by the focus adjusting means, the gap servo correcting means multiplies a gap error signal for the gap servo by a normalized gain in accordance with an adjustment amount of the focus adjusting means, and the gap servo correcting means reads, from storage means for storing a normalized gain corresponding to an adjustment amount of the focus adjusting means in advance, a normalized gain corresponding to the adjustment amount.

3. A servo control method executed by an optical disk recording apparatus that performs recording/reproduction of information with respect to an optical recording medium by using near-field light, comprising:
   a gap servo step of controlling a gap between the optical recording medium and optical means on the basis of a return light quantity of laser light via the optical means, the optical means including an objective lens group positioned in close proximity to the optical recording medium to generate near-field light from the laser light emitted from a light source;
   a focus adjusting step of adjusting focus of the near-field light radiated onto the optical recording medium of the optical means, in a state where gap servo is being performed by the gap servo step; and
   a gap servo correcting step of correcting the gap servo by the gap servo step when focus of the near-field light is adjusted by the focus adjusting step, the gap servo correcting step includes converting an adjustment amount in the focus adjusting step into an address, reading a normalized gain from a table in accordance with the address, and multiplying a total-reflection return light quantity by the normalized gain.

4. An optical disk apparatus which performs recording and/or reproduction of information with respect to an optical recording medium by using near-field light, comprising:
   a light source that emits laser light;
   an optical section including an objective lens group positioned in close proximity to the optical recording medium to generate near-field light from laser light emitted from the light source;
   a gap servo section configured to control a gap between the optical recording medium and the optical section on the basis of a return light quantity of the laser light via the optical section;
   a focus adjusting section configured to adjust focus of the near-field light radiated onto the optical recording medium of the optical section, in a state where gap servo is being performed by the gap servo section; and
   a gap servo correcting section configured to correct the gap servo by the gap servo section when focus of the near-field light is adjusted by the focus adjusting section, the gap servo correcting section multiplies a gap error signal for the gap servo by a normalized gain in accordance with an adjustment amount of the focus adjusting section.

* * * * *